(12) United States Patent
Inaji et al.

(10) Patent No.: US 7,064,919 B2
(45) Date of Patent: Jun. 20, 2006

(54) DISK STORAGE APPARATUS

(75) Inventors: Toshio Inaji, Osaka (JP); Hiroshi Kohso, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 389 days.

(21) Appl. No.: 09/907,572

(22) Filed: Jul. 19, 2001

(65) Prior Publication Data

US 2002/0027740 A1 Mar. 7, 2002

(30) Foreign Application Priority Data

Jul. 19, 2000 (JP) ............................ P2000-218623

(51) Int. Cl.
*G11B 5/596* (2006.01)
(52) U.S. Cl. .................................................. 360/78.06
(58) Field of Classification Search ............. 360/78.06, 360/78.09, 77.02, 78.04, 75, 73.03, 78.07, 360/78.08, 77.04; 318/109
See application file for complete search history.

(56) References Cited

U.S. PATENT DOCUMENTS

| | | | |
|---|---|---|---|
| 5,182,684 A | | 1/1993 | Baker et al. |
| 5,369,345 A | | 11/1994 | Le et al. |
| 5,384,676 A | * | 1/1995 | Yokoyama et al. ....... 360/77.13 |
| 5,402,400 A | * | 3/1995 | Hamada et al. .......... 360/78.06 |
| 5,721,648 A | | 2/1998 | Phan et al. |
| 5,940,239 A | * | 8/1999 | Lee et al. ................. 360/77.02 |
| 5,949,608 A | * | 9/1999 | Hunter .................... 360/78.09 |
| 6,046,878 A | * | 4/2000 | Liu et al. ...................... 360/75 |
| 6,097,564 A | * | 8/2000 | Hunter .................... 360/78.04 |
| 6,108,157 A | * | 8/2000 | Yoneda et al. ................. 360/75 |
| 6,134,071 A | * | 10/2000 | Andoh et al. .................. 360/75 |
| 6,215,609 B1 | * | 4/2001 | Yamashita et al. ....... 360/73.03 |
| 6,229,663 B1 | * | 5/2001 | Yoneda et al. ................. 360/75 |
| 6,229,664 B1 | * | 5/2001 | Albrecht et al. ............... 360/75 |
| 6,363,214 B1 | * | 3/2002 | Merello et al. ............. 318/109 |
| 6,411,457 B1 | * | 6/2002 | Yamashita et al. ....... 360/73.03 |
| 6,496,319 B1 | * | 12/2002 | Kusumoto et al. ............ 360/75 |
| 6,563,660 B1 | * | 5/2003 | Hirano et al. .................. 360/75 |
| 6,590,731 B1 | * | 7/2003 | Pan et al. ...................... 360/75 |
| 6,594,102 B1 | * | 7/2003 | Kanda et al. .................. 360/75 |
| 6,643,088 B1 | * | 11/2003 | Kawachi ...................... 360/75 |
| 6,697,207 B1 | * | 2/2004 | Harmer ....................... 360/75 |

FOREIGN PATENT DOCUMENTS

| | | |
|---|---|---|
| DE | 2 284 281 | 5/1995 |
| EP | 0 667 615 | 8/1995 |

* cited by examiner

*Primary Examiner*—William Klaowicz
*Assistant Examiner*—Fred F. Tzeng
(74) *Attorney, Agent, or Firm*—McDermott Will & Emery LLP

(57) ABSTRACT

In a disk storage apparatus having an actuator for loading/unloading a magnetic head with respect to a magnetic disk, a voltage signal generated when the actuator is driven is detected by a voltage detector, a speed load estimator estimates moving speed of the head and level of load disturbance added to the magnetic head from a driving signal in a driver of the actuator and the voltage signal, and outputs a speed estimating signal and a load estimating signal, a speed controller generates and outputs a speed control signal based on a speed command signal and the speed estimating signal, a synthesizer generates a driving signal from the load estimating signal and a speed control signal, and the apparatus loads and unloads the head at a stable speed against the load disturbance caused by friction or the like on a ramp block.

25 Claims, 15 Drawing Sheets

[FIG. 1]
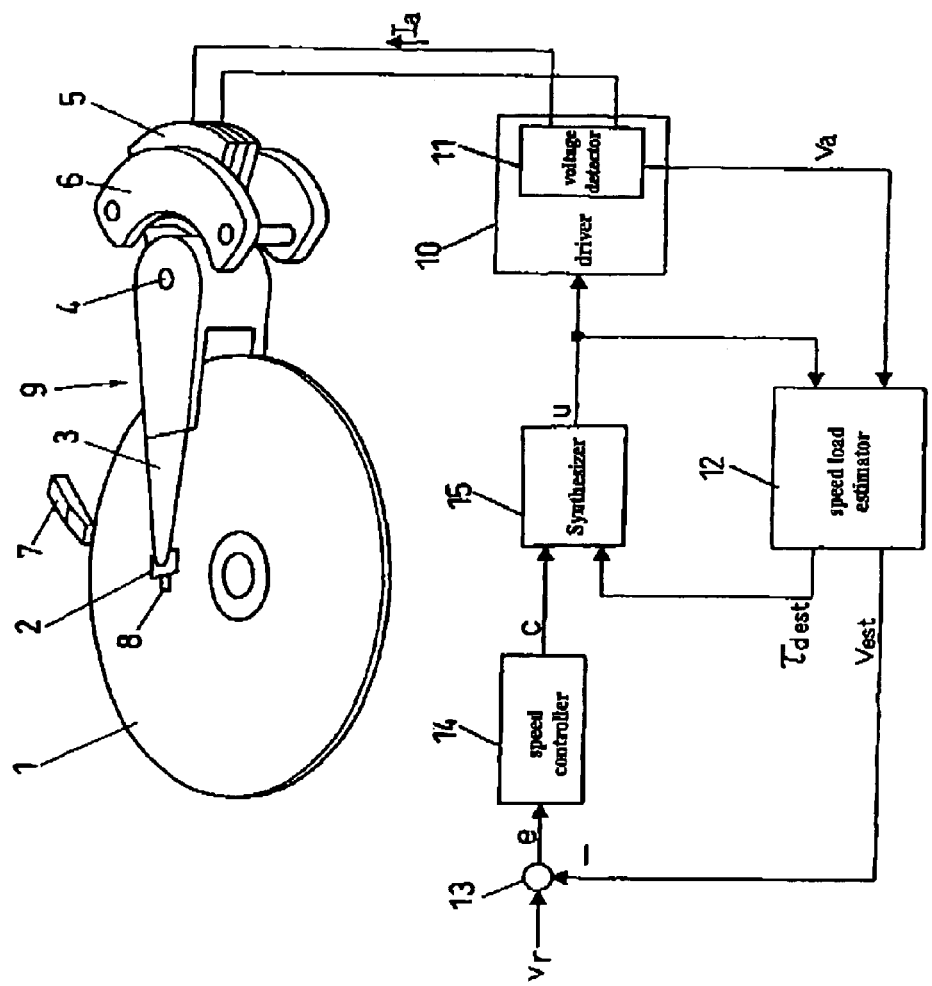

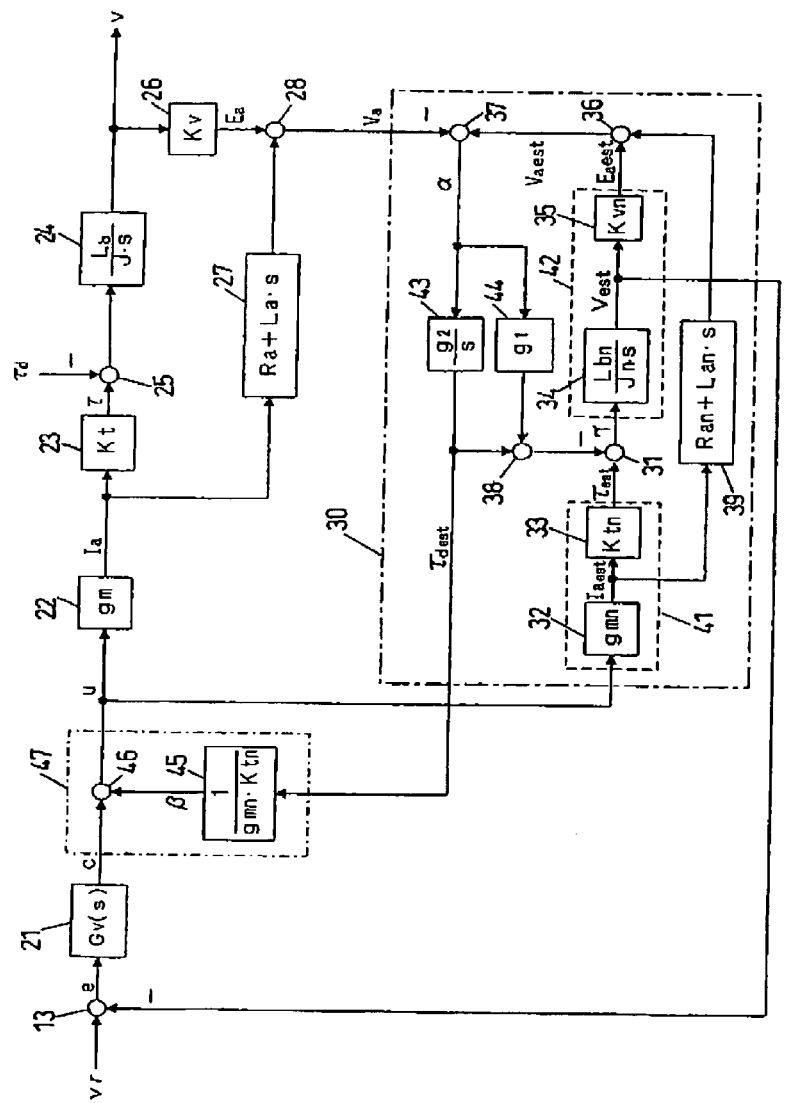
[FIG. 2]

[FIG. 3]
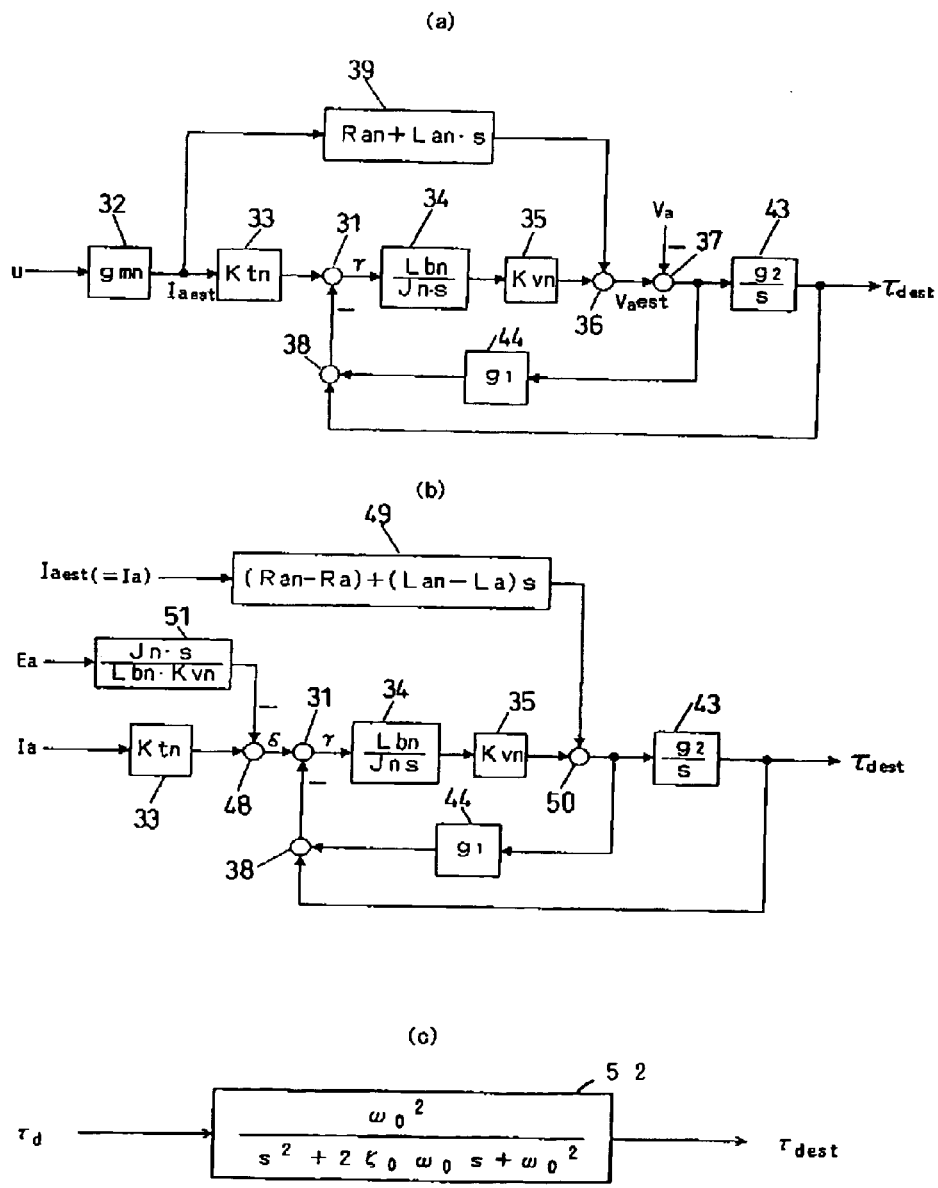

[FIG. 4]
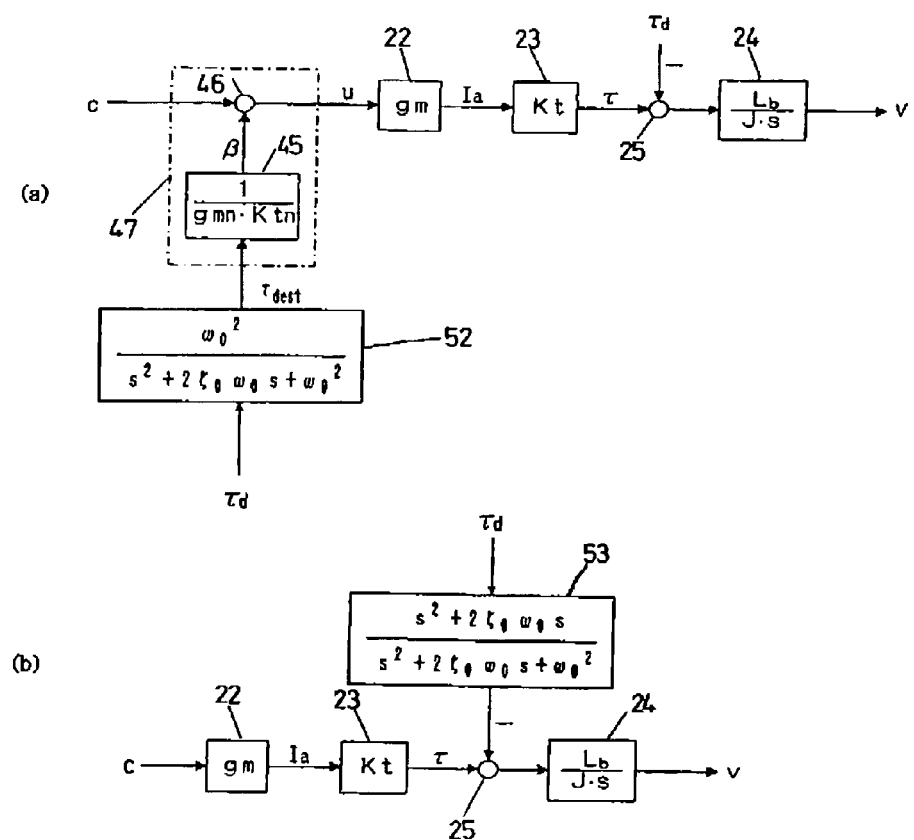

[FIG. 5]
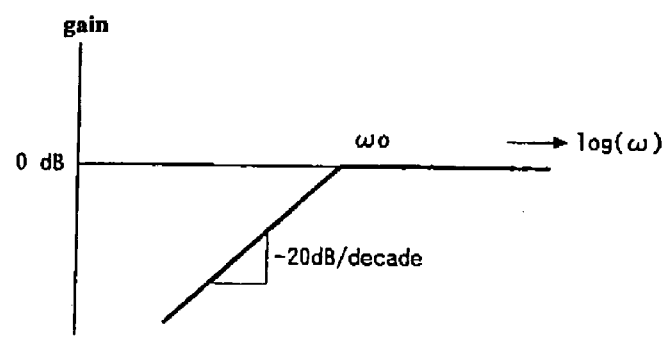

[FIG. 6]
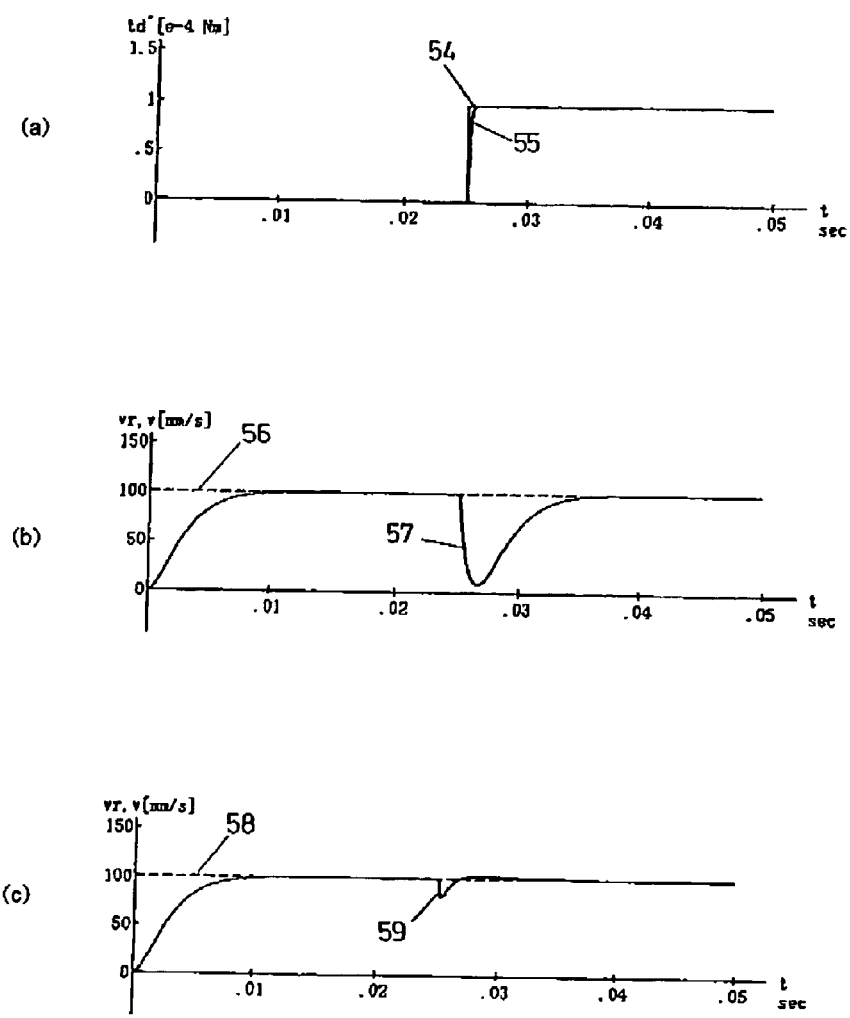

[FIG. 7]
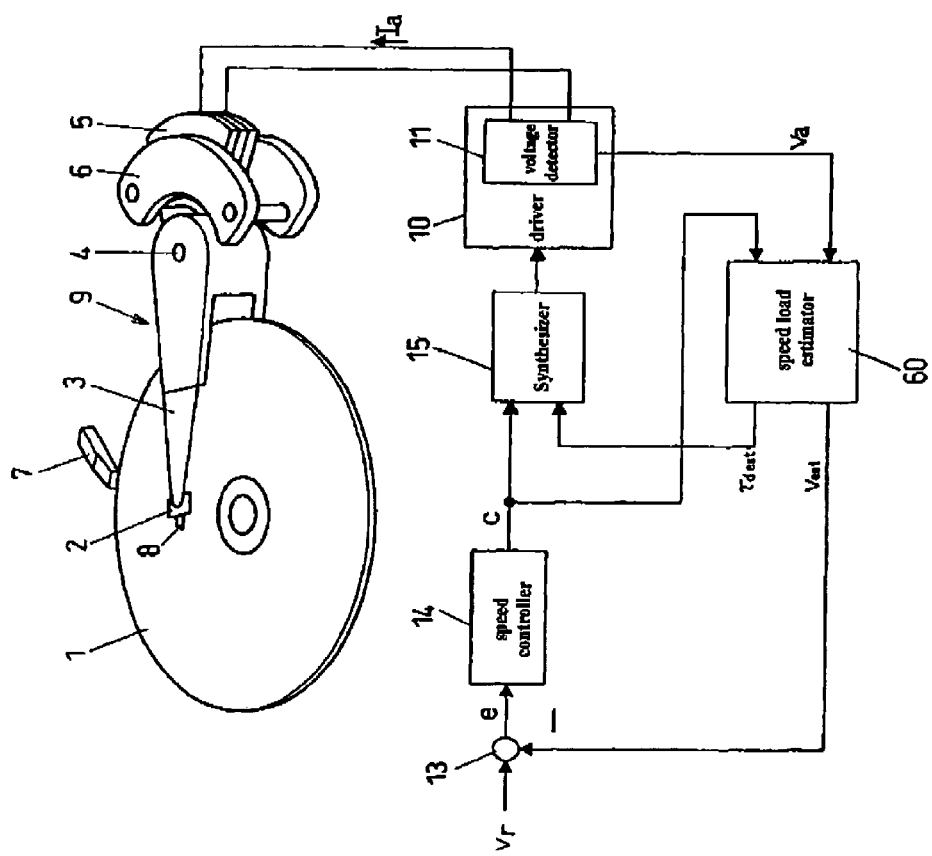

[FIG. 8]
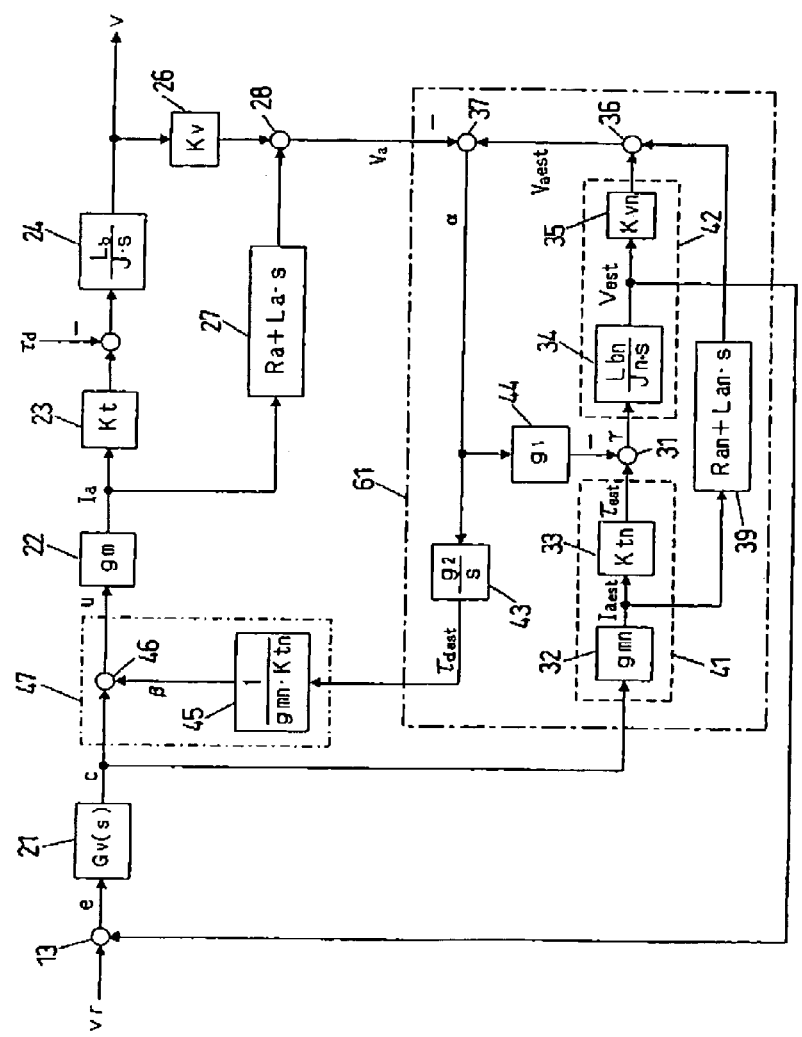

[FIG. 9]
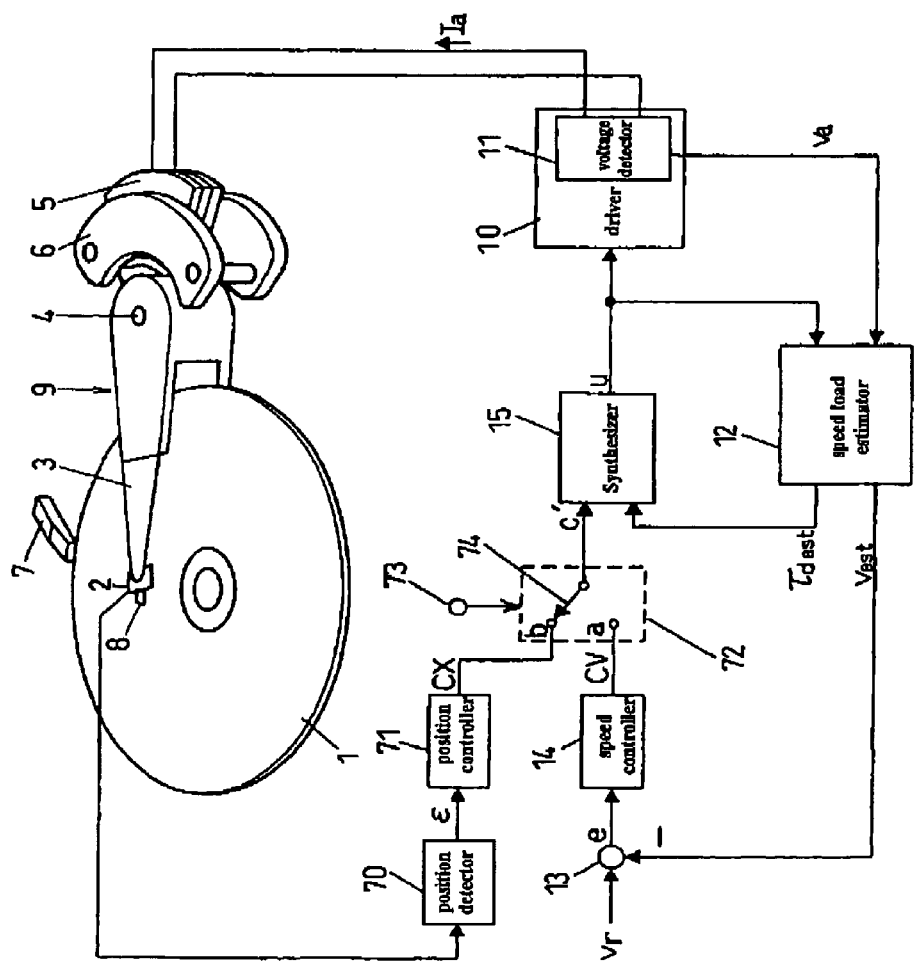

[FIG. 10]
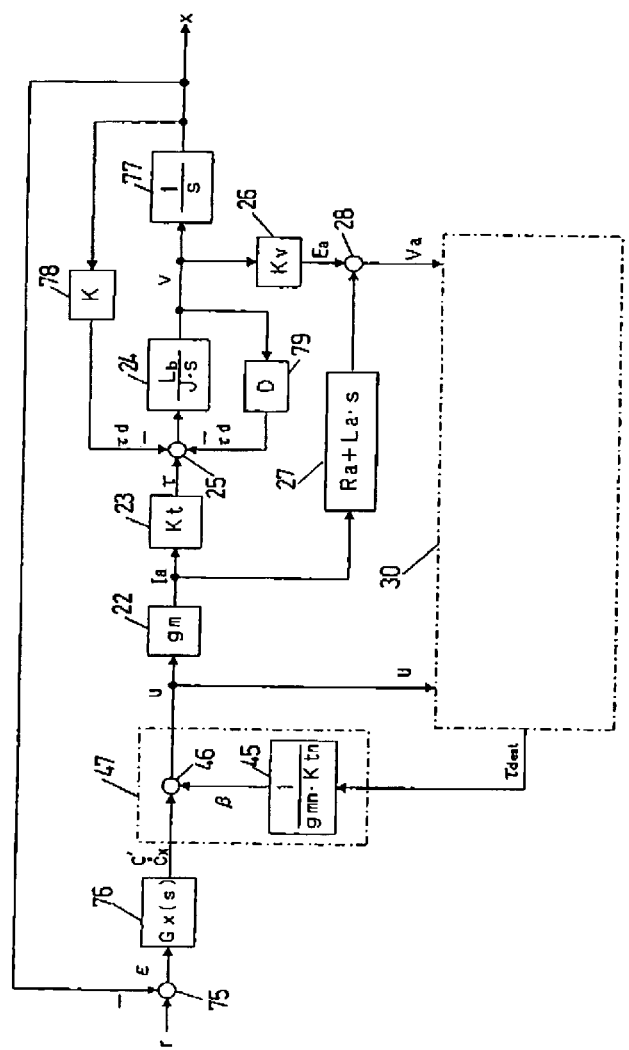

[FIG. 11]
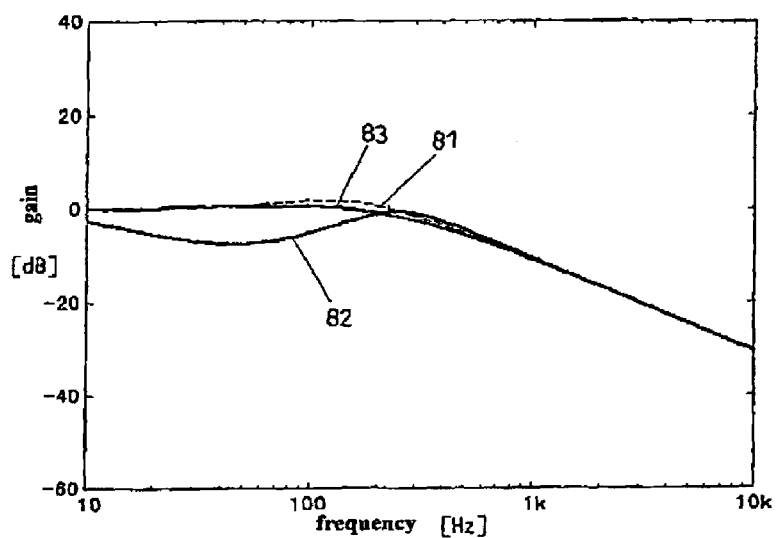

[FIG. 12]
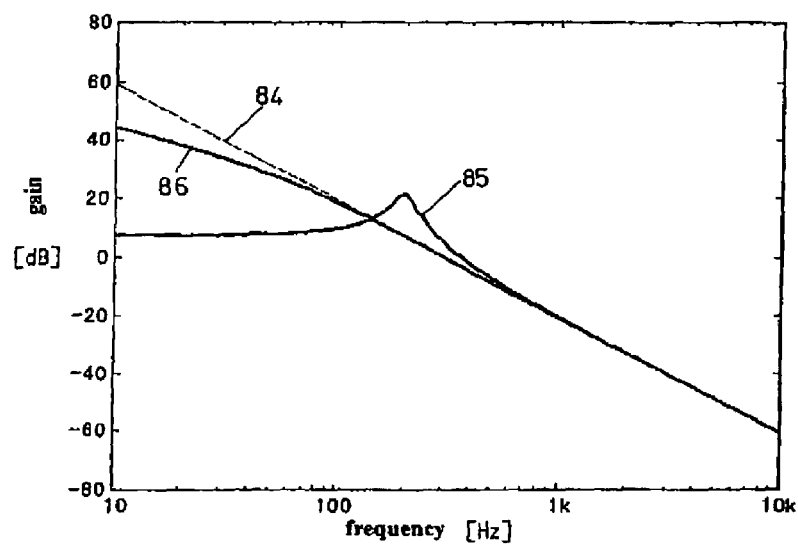

[FIG. 13]
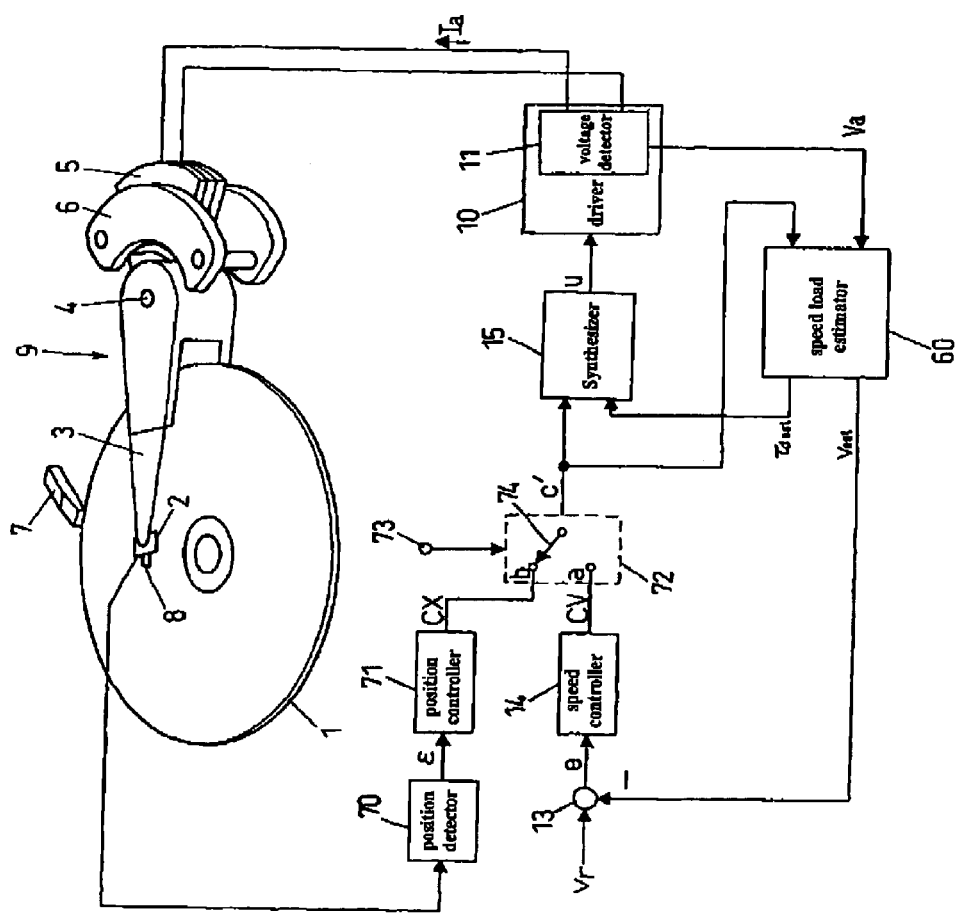

[FIG. 14]
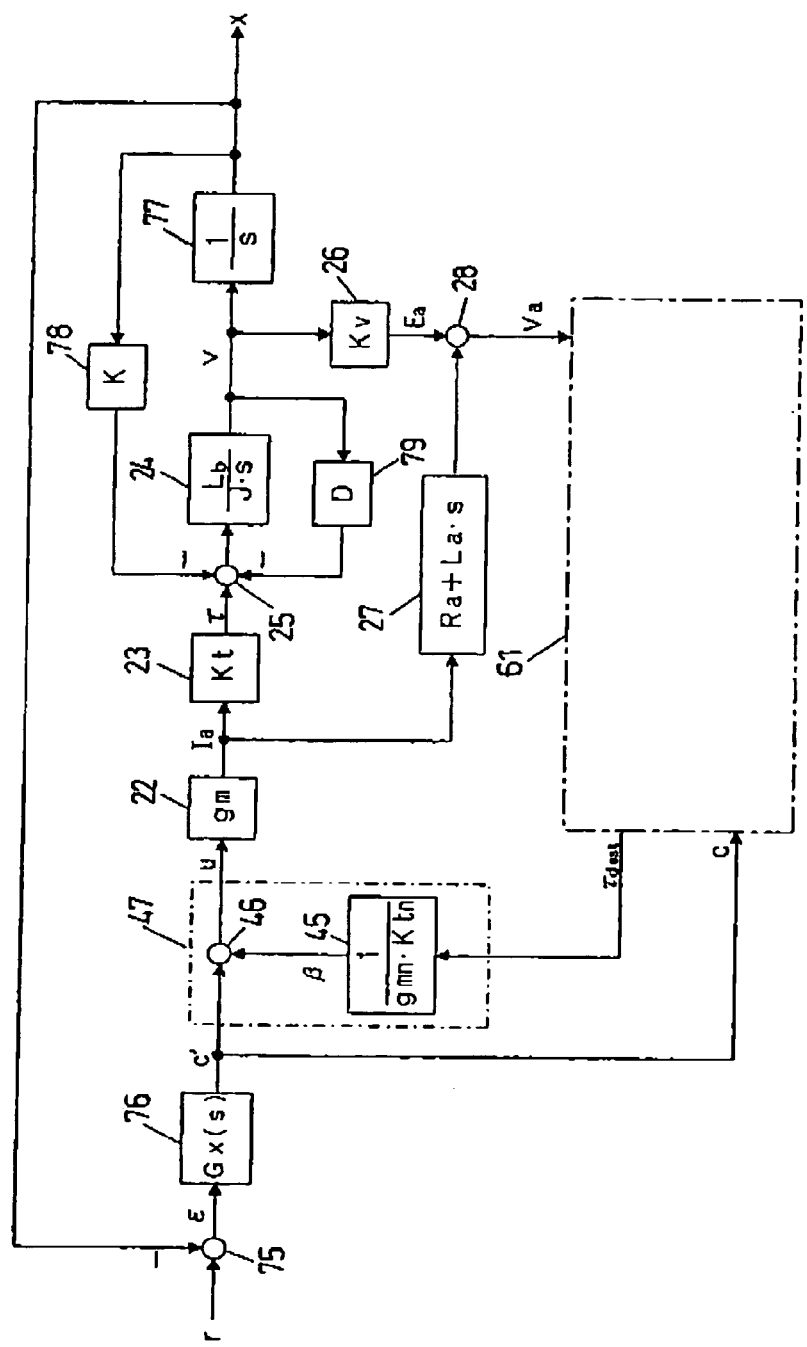

[FIG. 15]
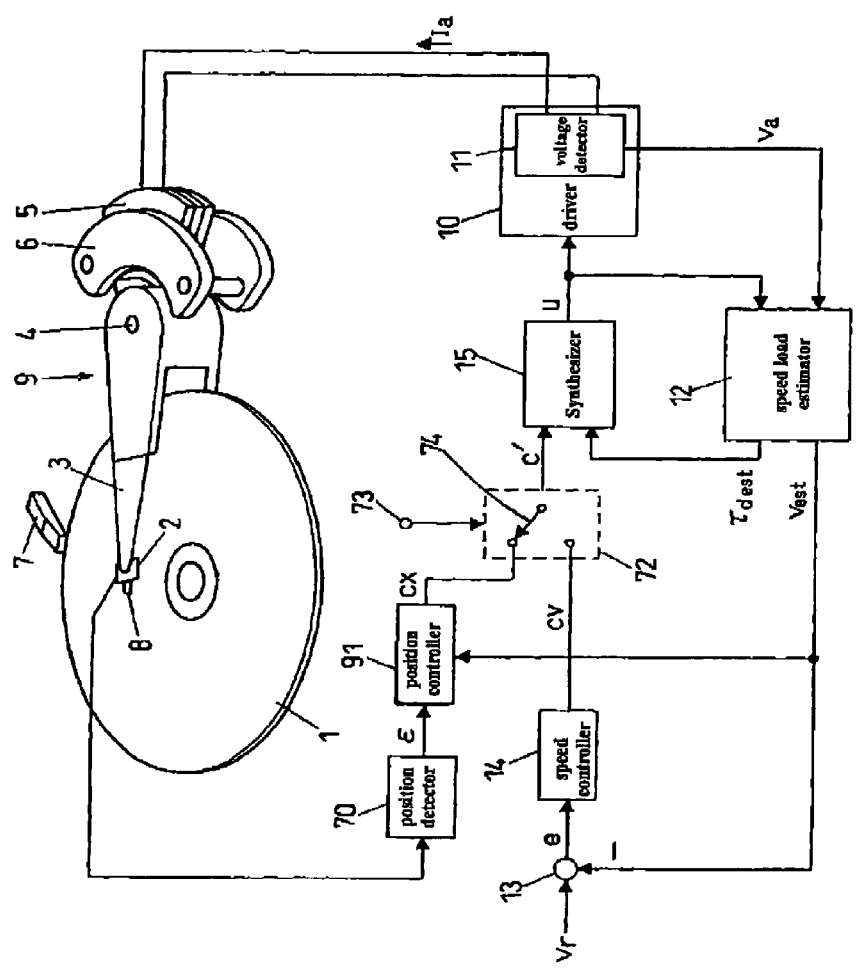

DISK STORAGE APPARATUS

BACKGROUND OF THE INVENTION

1. Field of the Invention

The present invention relates to a disk storage apparatus having a load/unload mechanism for loading and unloading a recording/reproducing head such as a magnetic head onto or from a disk surface which is a recording medium by an actuator. The invention also relates to a disk storage apparatus for positioning a head on a target track of a disk with high precision by an actuator.

2. Description of the Related Art

In a magnetic disk storage apparatus, with a tendency of downsizing and high storage density, the requirement of high precision positioning of a head with respect to a target track becomes more strict. Further, since it is necessary to flatten a disk surface for increasing the recording density, there is a method for retreating a head slider outward of a disk when the head is not actuated.

In a disk storage apparatus having the head load/unload mechanism, a ramp block as a retreating member is disposed outside the disk. When the apparatus is stopped, a head arm is turned to place the head slider on the ramp block, thereby unloading the head. When the actuation of the apparatus is started, the head arm is turned, the head slider is loaded on the disk from the ramp block.

If the loading speed is too fast, the head slider crashes against the disk, and the disk and the head are damaged In or to smoothly load the head on the disk, it is necessary to stably control speed even on the ramp block.

A voice coil motor (VCM) is used as an actuator which drives the head. Induction voltage generated on both ends of the VCM coil when the VCM is turned is detected by a bridge circuit, and feedback speed control is carried out while using the obtained detection voltage as a speed signal.

On the other hand, in order to quicken the positioning operation of the head with respect to the target track and to secure required positioning precision, it is generally believed that control frequency of positioning control is set higher. However, since a positioning control system becomes unstable due to natural mechanical oscillation of the head actuator, there is a limit for increasing the control frequency of the positioning control. Thereupon, the positioning precision is enhanced by reducing external fore acting on the actuator.

Conventionally, a head position signal obtained from servo information on the disk and a driving signal of the actuator are inputted to estimate the external force, thereby carrying out the feedback control to compensate the external force.

However, although the bridge circuit is simple in circuit structure, the bridge circuit is susceptible to variation in load disturbance caused by friction or the like on the ramp block.

If the variation in load disturbance by the sliding friction between the head slider and the ramp block is great, speed of the head slider is largely varied. Therefore, even if the feedback control is carried out for the head slider moving speed, the variation in head loading speed is great, and possibility of crash of the slider against the disk still remains.

Further, with the recent tendencies of high density of track and downsizing of the actuator, the external force acting on the actuator affects the control system more seriously, and the conventional technique can not sufficiently overcome the problem.

SUMMARY OF THE INVENTION

Therefore, it is a main object of the present invention to provide a disk storage apparatus capable of stabilizing the speed control and smoothly loading a head on a disk even if the variation in load disturbance is great.

It is another object of the invention to provide a disk storage apparatus capable of controlling the positioning operation of the head with respect to a target track with high precision.

These and other objects, advantages, features, and uses of the invention will become more apparent from the following description of preferred embodiments of the invention with reference to the accompanying drawings wherein:

a disk storage apparatus of the present invention includes an actuator for loading/unloading a head with respect to a disk, a driver of the actuator, a voltage detector for detecting voltage generated when the actuator is driven and for outputting a voltage signal, a speed load estimator for estimating moving speed of the head and level of a load disturbance added to the head from a driving signal in the voltage detector and the voltage signal, and for outputting a speed estimating signal and a load estimating signal, and a speed controller for generating and outputting a speed control signal from a speed command signal and the speed estimating signal, wherein the driving signal is obtained by synthesizing the speed control signal and the load estimating signal.

To control the speed of the actuator which loads and unloads the head, the moving speed of the head is estimated. To cancel the load disturbance applied from the head retreating member such as a ramp block, the level of the load disturbance is estimated. When the levels of the head moving speed and the load disturbance are estimated, two elements are used.

One of them is a voltage signal obtained by detecting voltage generated when the actuator is driven. The other one of them is a driving signal in the driver of the actuator. Here, the driving signal in the driver may be a signal input to the driver or may be a signal output from the driver.

A speed control signal which is a base for generating the driving signal may be used instead of the driving signal in the driver. A speed load estimator for estimating the levels of the head moving speed and the load disturbance is provided.

With this speed load estimator, a voltage signal detected by a voltage detector and the driving signal in the driver (including speed control signal) are inputted, thereby generating a speed estimating signal and a load estimating signal. The load estimating signal generated based on the two elements precisely estimates the level of the load disturbance which is actually added to the head.

Since the head moving speed is estimated during the course of estimation of the level of the load disturbance, the head moving speed is also estimated precisely.

The load estimating signal obtained in the above-described manner is synthesized into the speed control signal, and the actuator of the head is driven using the driving signal. With this, the load disturbance applied to the head is excellently canceled.

Further, since the speed is controlled in direct association with the load estimating signal, even if the variation in load disturbance of the head retreating member is great at the time of loading/unloading, the speed can stably be controlled.

That is, the reliability of load/unload operation is enhanced. As a spillover effect, the track density can be substantially enhanced, and the disk storage apparatus of large capacity is realized.

Preferably, the speed load estimator includes a comparator to which a voltage signal detected by the voltage detector is inputted, a first multiplier for multiplying the driving signal by a first coefficient, a second multiplier for multiplying output of the comparator by a second coefficient, a first integrator for integrating output of the comparator, and a second integrator for integrating a value obtained by subtracting, from the output of the first multiplier, an added value obtained by adding the output of the second multiplier and the output of the first integrator, and wherein the comparator compares the voltage signal and output of the second integrator, and outputs a result of the comparison to the second multiplier and the first integrator.

In this case, output of the first multiplier inputting the driving signal becomes a driving torque estimating signal which corresponds to drive torque applied to the actuator.

Output of the second integrator becomes a feedback element (subject of comparison) with respect to voltage signal input from the voltage detector. Output of the comparator which takes difference between the voltage signal and the feedback element from the second integrator is applied to the first integrator and the second multiplier.

Output of the first integrator which integrates the difference becomes a load estimating signal which corresponds to the load disturbance received by the actuator.

Output of the second multiplier which multiplies the difference by a predetermined coefficient is added to the load estimating signal. A difference of the added value is taken from the driving torque estimating signal and is given to the second integrator. A value which is being calculated by the second integrator can be taken as the speed estimating signal.

As a result, the load estimating signal output from the first integrator corresponds to a signal which precisely estimates the load disturbance received by the actuator.

With this load estimating signal, the feedback control is carried out such as to cancel the load disturbance applied to the head and therefore, the load disturbance can be compensated.

Further, the speed is controlled in direct association with the load estimating signal, even if the load disturbance is largely varied at the time of loading/unloading, it is possible to stably control the speed and to enhance the reliability of head loading/unloading operation.

A disk storage apparatus of the present invention includes an actuator for loading/unloading a head with respect to a disk, a driver of the actuator, a voltage detector for detecting voltage generated when the actuator is driven and for outputting a voltage signal, a speed load estimator for estimating moving speed of the head and level of a load disturbance added to the head from a speed control signal and the voltage signal, and for outputting a speed estimating signal and a load estimating signal, and a speed controller for generating and outputting the speed control signal from a speed command signal and the speed estimating signal, wherein the driving signal in the detector is obtained by synthesizing the speed control signal and the load estimating signal.

In this case, the speed control signal from the speed controller is inputted to the speed load estimator instead of the driving signal in the driver of the above-described invention.

In this case, the speed load estimator precisely estimates the head moving speed and the level of the load disturbance applied to the head based on the speed control signal and the voltage signal detected by the actuator. Other portions are the same as those described above.

In the invention using a speed control signal for one input of the speed load estimator, preferably, the speed load estimator includes a comparator to which a voltage signal detected by the voltage detector is inputted, a first multiplier for multiplying the speed control signal by a first coefficient, a second multiplier for multiplying output of the comparator by a second coefficient, a first integrator for integrating output of the comparator, and a second integrator for integrating a value obtained by subtracting output of the second multiplier from output of the first multiplier, and wherein the comparator compares the voltage signal and output of the second integrator, and outputs a result of the comparison to the second multiplier and the first integrator.

In this case, it is unnecessary to add the output of the first integrator and the output of the second multiplier which is required in the case of the above-described invention in which the driving signal is used for one input of the speed load estimator. Therefore, The adder can be omitted, which simplifies the structure.

In the above description, more preferably, the speed load estimator outputs the load estimating signal in a state in which a high-band frequency component is cut off. In the above structure, the load estimating signal concerning the load disturbance caused by friction or the like is generated by estimating using the secondary delay system. This secondary delay system has low-band cut off filter characteristic which exhibits excellent load disturbance restraining effect under natural angular frequency (estimated angular frequency). Thereupon, the natural angular frequency and the damping factor are appropriately set, and the speed load estimator is constituted such that the load estimating signal is generated in a state in which the high-band frequency component is interrupted. With this, excellent load disturbance restraining effect is exhibited.

Further, a disk storage apparatus of the present invention includes an actuator for loading/unloading a head with respect to a disk, a driver of the actuator, a voltage detector for detecting voltage generated when the actuator is driven and for outputting a voltage signal, a speed estimator for estimating moving speed of the head from a driving signal in the detector and the voltage signal, and for outputting a speed estimating signal, and a speed controller for generating a speed control signal from a speed command signal and the speed estimating signal, and for outputting as the driving signal.

This is for a case in which the variation in load disturbance is small. It is possible to stably control the speed only with the speed estimating signal without using the load estimating signal, and to enhance the reliability of the head loading/unloading operation. In this case, a synthesizer for synthesizing the load estimating signal into the speed control signal is unnecessary, which simplifies the structure of the disk storage apparatus.

The speed estimator includes a comparator to which a voltage signal detected by the voltage detector is inputted, a first multiplier for multiplying the driving signal by a first coefficient, a second multiplier for multiplying output of the comparator by a second coefficient, a first integrator for integrating output of the comparator, and a second integrator for integrating a value obtained by subtracting, from the output of the first multiplier, an added value obtained by adding the output of the second multiplier and the output of the first integrator, and wherein the comparator compares the voltage signal and output of the second integrator, and outputs a result of the comparison to the second multiplier and the first integrator.

In this case, the load estimating signal output from the first integrator is not directly used for the feedback control, but the speed estimating signal is generated while taking the load estimating signal into account. This load estimating signal which was taken into account corresponds to a signal which precisely estimates the load disturbance caused by friction or the like actually received by the head retreating member.

As a result, when the variation in load disturbance on the head retreating member is small at the time of loading/unloading, the speed is controlled stably only by the speed estimating signal, which enhances the reliability of the head loading/unloading operation.

Further, a disk storage apparatus of the present invention includes an actuator for moving a head with respect to a disk, a driver of the actuator, a voltage detector for detecting voltage generated when the actuator is driven and for outputting a voltage signal, a speed load estimator for estimating moving speed of the head and level of a load disturbance added to the head from a driving signal in the detector and the voltage signal, and for outputting a speed estimating signal and a load estimating signal, a speed controller for generating and outputting a speed control signal from a speed command signal and the speed estimating signal, a position detector for generating and outputting an error signal detected by the head corresponding to a current position of the head from servo information which is previously recorded in the disk, a position controller for generating and outputting a position control signal corresponding to the error signal, and a selector to which the speed control signal and the position control signal are inputted, and either one of the control signals being selected and outputted in accordance with a switching command, wherein the driving signal is obtained by synthesizing the control signal output from the selector and the load estimating signal.

This invention corresponds to one in which a high precision positioning function of the head to the target track is added to the above-described invention for inputting the driving signal to the speed load estimator. The procedure is proceeded to a positioning action of the head to the target track by a switching command after the head was loaded to the disk from the head retreating member.

It is not always necessary to load or unload the head from the head retreating member, and a seek operation may be carried out from the standby region outside the data region on the disk. The selector switches the action to input of the position control signal from the position controller.

Based on the driving signal applied to the driver for driving the actuator and the voltage signal detected by the detector, the speed load estimator precisely estimates the load disturbance such as the bearing friction of the actuator, elastic force of a flexible printed circuit (FPC) which connects the actuator and the electronic circuit with each other, inertia received by the actuator due to impact or vibration applied to the apparatus from outside.

Especially, it is important that the load disturbance is precisely estimated at the time of following action in which the head is allowed to follow the target track.

The obtained load estimating signal is synthesized into the position control signal output from the selector, thereby generating the driving signal, and with this driving signal, and the actuator of the head is driven. With this, the load disturbance such as the bearing friction and the elastic force applied to the actuator is excellently canceled.

That is, since the external force such as the bearing friction and the elastic force applied to the actuator can be compensated, even if the load disturbance such as the bearing friction, elastic force and inertia is largely varied at the time of following operation toward the target track, it is possible to stably control the positioning operation of the head to the target track, and to enhance the positioning precision.

In the invention to which a high precision positioning function of the head of the target track is added, preferably, the speed load estimator includes a comparator to which a voltage signal detected by the voltage detector is inputted, a first multiplier for multiplying the driving signal by a first coefficient, a second multiplier for multiplying output of the comparator by a second coefficient, a first integrator for integrating output of the comparator, and a second integrator for integrating a value obtained by subtracting, from the output of the first multiplier, an added value obtained by adding the output of the second multiplier and the output of the first integrator, and wherein the comparator compares the voltage signal and output of the second integrator, and outputs a result of the comparison to the second multiplier and the first integrator.

In this case, the load estimating signal output from the first integrator corresponds to a signal which precisely estimates the load disturbance that the actuator receives from the bearing or EPC.

With the load estimating signal precisely obtained in this manner, the feedback control such as to cancel the load disturbance applied to the actuator is carried out. Therefore, the external force applied to the actuator at the time of the following action can be compensated.

Even if the load disturbance of the actuator at the time of the following action is largely varied, it is possible to stably control the positioning operation of the head to the target track, and to enhance the positioning precision.

Further, a disk storage apparatus of the present invention includes an actuator for moving a head with respect to a disk, a driver of the actuator, a voltage detector for detecting voltage generated when the actuator is driven and for outputting a voltage signal, a speed controller for generating and outputting a speed control signal from a speed command signal and the speed estimating signal, a position detector for generating and outputting an error signal detected by the head and corresponding to a current position of the head from servo information, a position controller for generating and outputting a position control signal corresponding to the error signal, a selector to which the speed control signal and the position control signal are inputted, and either one of the control signals being selected and outputted in accordance with a switching command, and a speed load estimator for estimating moving speed of the head and level of a load disturbance added to the head from the voltage signal and a control signal output from the selector, and for outputting the speed estimating signal and a load estimating signal, wherein the driving signal is obtained by synthesizing the control signal output from the selector and the load estimating signal.

This invention corresponds to one in which a high precision positioning function of the head to the target track is added to the above-described invention for inputting the driving signal to the speed load estimator.

Other points are the same as those described above. Since the external force applied to the actuator at the time of the following action can be compensated. Even if the load disturbance of the actuator at the time of the following action is largely varied, it is possible to stably control the positioning operation of the head to the target track, and to enhance the positioning precision.

In the invention to which the high precision positioning function of the head of the target track is added and a speed control signal is used for one input of the speed load estimator, preferably, the speed load estimator includes a comparator to which a voltage signal detected by the voltage detector is inputted, a first multiplier for multiplying the driving signal by a first coefficient, a second multiplier for multiplying output of the comparator by a second coefficient, a first integrator for integrating output of the comparator, and a second integrator for integrating a value obtained by subtracting output of the second multiplier from output of the first multiplier, and wherein the comparator compares the voltage signal and output of the second integrator, and outputs a result of the comparison to the second multiplier and the first integrator.

In this case, it is unnecessary to add the output of the first integrator to the output of the second multiplier which was necessary in the above-described invention which uses the driver for one input to the speed load estimator. Therefore, The adder can be omitted, which simplifies the structure.

Further, a disk storage apparatus of the present invention includes an actuator for moving a head with respect to a disk, a driver of the actuator, a voltage detector for detecting voltage generated when the actuator is driven and for outputting a voltage signal, a speed estimator for estimating moving speed of the head from a driving signal in the detector and the voltage signal, and for generating and outputting a speed estimating signal, a speed controller for generating and outputting a speed control signal by a speed command signal and the speed estimating signal, a position detector for generating and outputting an error signal detected by the head and corresponding to a current position of the head from servo information, a position controller for generating and outputting a position control signal from an error signal output from the position detector and a speed estimating signal output from the speed estimator, and a selector to which the speed control signal and the position control signal are inputted and either one of the control signals being selected, and the selected control signal being outputted as the driving signal.

This corresponds to a case in which the variation in load disturbance is small. It is possible to stably control the speed only with the speed estimating signal without using the load estimating signal, and to enhance the reliability of the head loading/unloading operation. In this case, a synthesizer for synthesizing the load estimating signal into the speed control signal is unnecessary, which simplifies the structure of the disk storage apparatus.

In the invention to which the high precision positioning function of the head of the target track is added, more preferably, the position controller generates the position control signal based on the error signal output from the position detector and the speed estimating signal output from the speed load estimator.

The effect in this case is as follows. The servo information recorded in the disk is a discrete signal having constant sampling cycle, and is not continuous signal. When differentiation processing is carried out as in the PID (proportional-plus-integral-plus-derivative) control, the differentiation processing of discontinuous error signal concerning the head position is carried out by dividing the difference between the error signal value at the current sampling timing and the error signal value at the time of the last sampling timing by the sampling cycle. Therefore, there is a possibility that noise effect is included in the result value of the differentiation processing, and there is an adverse possibility that great error signal is generated when a seek mode in which the head is moved to the target track is switched to the following mode in which the head is allowed to follow the target track. If such thing occurs, malfunction is caused in the following action, or access time during which data is read becomes long.

Thereupon, instead of the malfunction of the error signal, the speed estimating signal is used utilizing the fact that the differentiation of the position becomes speed. The speed estimating signal output by the speed load estimator is a continuous signal which is less prone to be affected by noise, and does not depend on the sector sampling cycle of the disk storage apparatus. Therefore, malfunction is less prone to be caused in the following action. Further, the access time during which the data is read can be shortened.

Further, it is preferable that a control band of the speed load estimator is set greater than a control band of the positioning controller or the positioning control system.

In this case, to widen the control band of the positioning control system is to increase the gain of proportion. An upper limit exists by sampling frequency of a sector servo of the disk storage apparatus or natural mechanical resonance frequency possessed by the actuator.

Whereas, the speed load estimator is not affected by the sampling frequency of the sector servo. Therefore, in the speed load estimator, its control band can be set higher than the control band of the positioning control system or the speed control system. As a result, the head is allowed to follow the target track precisely over higher control band.

In the above description, the actuator may be constituted such as to load or unload the head with respect to the disk, or may be constituted such as to be placed on a standby region of formation outside the data region in the disk when the disk storage apparatus is not operated.

BRIEF DESCRIPTION OF THE DRAWINGS

FIG. 1 is a block diagram showing a structure of a magnetic disk storage apparatus according to a first preferred embodiment of the present invention;

FIG. 2 is a block diagram showing the entire structure of a speed control system which is a constituent element in FIG. 1;

FIG. 3(A) is a block diagram for explaining a load disturbance estimating action of a speed load estimator which is a constituent element in FIG. 2;

FIG. 3(B) is a block diagram obtained by equivalently converting the block diagram shown in FIG. 3(A);

FIG. 3(C) is a block diagram showing the block diagram in FIG. 3(A) collectively;

FIG. 4(A) is a block diagram for explaining action for restraining the load disturbance applied to the magnetic disk storage apparatus in FIG. 1;

FIG. 4(B) is a block diagram obtained by equivalently converting the block diagram shown in FIG. 4(A);

FIG. 5 is a view showing cut-off frequency characteristic with respect to the load disturbance applied to the disk storage apparatus shown in FIG. 1;

FIG. 6(A) is a graph showing time of variation in the load disturbance applied to the magnetic disk storage apparatus shown in FIG. 1 and a load estimating signal output from the speed load estimator;

FIG. 6(B) is a graph showing time of head moving speed when a load estimating signal output from the speed load estimator is not inputted to a synthesizer;

FIG. 6(C) is a graph showing time of the head moving speed when the load estimating signal output from the speed load estimator is inputted to the synthesizer to cancel the variation of the load disturbance;

FIG. 7 is a block diagram showing a structure of a magnetic disk storage apparatus according to a second preferred embodiment of the present invention;

FIG. 8 is a block diagram showing the entire structure of a speed control system which is a constituent element in FIG. 7;

FIG. 9 is a block diagram showing a structure of a magnetic disk storage apparatus according to a third preferred embodiment of the present invention;

FIG. 10 is a block diagram showing the entire structure of a position control system which is a constituent element in FIG. 9;

FIG. 11 is a view showing frequency characteristic for explaining positioning control characteristic in the magnetic disk storage apparatus shown in FIG. 9;

FIG. 12 is a view showing frequency characteristic for explaining load disturbance-restraining effect in the magnetic disk storage apparatus shown in FIG. 9;

FIG. 13 is a block diagram showing a structure of a magnetic disk storage apparatus according to a fourth preferred embodiment of the present invention;

FIG. 14 is a block diagram showing the entire structure of a position control system which is a constituent element in FIG. 13; and FIG. 15 is a block diagram showing a structure of a magnetic disk storage apparatus according to a fifth preferred embodiment of the present invention.

In all these figures, like components are indicated by the same numerals.

DETAILED DESCRIPTION OF THE PREFERRED EMBODIMENTS

Preferred embodiments of the present invention will be explained with reference to the drawings below.

First Embodiment

In FIG. 1, a symbol 1 represents a magnetic disk rotated by a spindle motor (not shown), a symbol 2 represents a magnetic head for recording and reproducing data with respect to the disk 1, a symbol 3 represents a head arm. The head 2 is moved toward a target track in the disk 1 by turning the head 2 mounted on one end of the head arm 3 around a bearing 4.

A symbol 5 represents a drive coil provided on a rear end of the arm 3, and a symbol 6 represents a stator. A magnet (not shown) is disposed on a surface of the stator 6 opposed to the coil 5. The head arm 3 receives rotation force by interaction of magnetic flux generated by the magnet disposed on the stator 6 and magnetic field formed by current supplied to the coil 5. A symbol 7 represents a ramp block as a head retreating member disposed outside a region occupied by the disk 1. A symbol 8 represents a suspension tab provided on a tip end of the arm 3. The ramp block 7 has a ramp formed with a tab-holding surface, and this surface slides with respect to the suspension tab 8 in reply to the turning motion of the arm 3. The head 2, the arm 3, the bearing 4, the coil 5, the stator 6, the ramp block 7 and the suspension tab 8 constitute an actuator 9.

A symbol 10 represents a driver and a symbol 11 represents a voltage detector included in the driver 10. The voltage detector 11 detects voltage generated on opposite ends of the coil 5 and outputs voltage signal Va. A symbol 12 represents a speed load estimator which estimates the moving speed of the arm 3 and load torque applied to the arm 3 from the voltage signal Va output from the voltage detector 11 and a driving signal u which is input of the driver 10, and the speed load estimator 12 outputs a speed estimating signal vest and a load estimating signal τdest.

A symbol 13 represents a comparator which outputs an error signal e between a speed command signal vr (constant value) and the speed estimating signal vest. A symbol 14 represents a speed controller which amplifies and compensates phase based on the error signal e obtained by the comparator 13 and then, outputs a speed control signal c. A symbol 15 represents a synthesizer having a correcting function. The speed control signal c of the speed controller 14 and the load estimating signal τdest of the speed load estimator 12 are inputted to the synthesizer 15, and the synthesizer 15 carries out correction calculation and synthesizes and then, outputs the driving signal u to the driver 10. Each of these may be constituted by hardware such as an analog circuit or may be constituted by software.

The driver 10 applies driving current Ia to the coil 5 in accordance with the input driving signal u, turns the arm 3 around the bearing 4, and moves the head 2 mounted to the tip end of the arm 3. When the arm 3 is turned outside of the disk 1, the suspension tab 8 on the tip end of the arm 3 is placed on the tab-holding surface of the ramp block 7, thereby unloading the head slider.

Next, operation of the speed control system will be explained using FIG. 2. In FIG. 2, s represents Laplace operator.

In FIG. 2, if the moving speed of the head 2 is defined as v, and if a speed estimating signal which is a result estimated by the speed load estimator 12 which shows the head moving speed v with a block 30 is defined as vest, the error signal e with respect to the speed command signal vr is expressed with the following equation 1.

$$e = vr - vest \quad \text{[Equation 1]}$$

This error signal e is obtained by the comparator 13. The speed controller 14 shown in a block 21 carries out filter processing of a transfer function Gv(s) for the error signal e, generates a speed control signal c and outputs the same to an adder 46. The speed control signal c becomes the driving signal u through the adder 46. The driving signal u is converted into a gm times current signal from the voltage signal in the driver 10 in a block 22 (transfer function is gm), and outputs driving current Ia.

In the actuator 9 shown in FIG. 23, the driving current Ia supplied to the coil 5 is converted into driving torque T by the transfer function Kt by interaction between the magnetic field formed by the driving current Ia and magnetic flux of the magnet of the stator 6. There, the transfer function Kt is a torque constant of the actuator 9. A transfer function (Lb/J·s) in a block 24 shows transfer characteristic from the driving torque τ acting on the arm 3 to the moving speed v of the head 2. Here, J indicates inertia moment, and Lb shows a distance from the bearing 4 to the head 2.

Blocks 26 and 27 correspond to the voltage detector 11. If the actuator 9 is turned, induction voltage Ea is generated on each of opposite ends of the coil 5. The block 26 outputs this induction voltage Ea. If the driving current Ia is supplied to the coil 5, voltage drop (Ra+La·s)·Ia is generated. The block 27 outputs a signal of this voltage drop. An adder 28 adds them, and outputs terminal voltage of the actuator 9 as a voltage signal Va. That is, there is a relation of the following equation 2.

$$Va = Ea + (Ra + La \cdot s) \cdot Ia \quad \text{[Equation 2]}$$

Here, Ra represents coil resistance of the coil 5, and La represents inductance of the coil 5.

Load disturbance τd such as sliding friction is generated between the tab-holding surface on the ramp block 7 and the suspension tab 8. This load disturbance d can be expressed as being inputted into a front stage of a block 24 in the comparator 25.

A block 30 surrounded by a chain line in FIG. 2 shows a block diagram of the speed load estimator 12. This block 30 includes a block 32 having the same transfer function as that of the block 22, a block 33 having the same transfer function as that of the block 23 which is the actuator 9, a block 34 having the same transfer function as that of the block 24, a block 35 having the same transfer function as that of the block 26 which is the voltage detector 11, and a block 39 having the same transfer function as that of the block 27. A combination of the blocks 32 and 33 constitutes a first multiplier, a block 44 constitutes a second multiplier, a block 43 constitutes a first integrator, and a combination of the blocks 34 and 35 constitutes a second integrator. Here, a suffix "n" of each constant of the block 30 indicates a nominal value, and a variable to which "est" is added indicates an estimated value.

The driving signal u is inputted to the block 32 constituting the speed load estimator 12. The driving signal u is multiplied by (gmn·Ktn) by a multiplier 41 constituted by the blocks 32 and 33, thereby obtaining a drive torque estimating signal Test. The drive torque estimating signal Test is the same as the driving torque τ acting on the arm 3.

In FIG. 2, a speed estimating signal vest output from the block 34 in a second integrator 42 is fed back to the comparator 13 as being corresponding to the moving speed v of the head 2. In the block 35 in the second integrator 42, the speed estimating signal vest is multiplied by Kvn, thereby obtaining induction voltage estimating signal Eaest. Estimating current Iaest is supplied to the actuator 9, thereby obtaining voltage drop (Ran+Lan·s)·Iaest. This induction voltage estimating signal Eaest is added to the voltage drop (Ran+Lan·s)·Iaest by The adder 36, and voltage estimating signal Vaest is output. The voltage estimating signal Vaest is input to a comparator 37, and is compared with voltage signal Va which was actually detected. An error signal α(=Va−Vaest) which is a result of comparison is inputted to the first integrator 43 and the second multiplier 44.

The first integrator 43 integrates the error signal α, and outputs a load estimating signal τdest for the load disturbance. The error signal α is inputted to the second multiplier 44, and is multiplied by g1 and added to the adder 38. The output of the adder 38 is inputted to a subtractor 31. In the subtractor 31, a result γ obtained by subtracting output (a sum of output of the first integrator 43 and output of the second multiplier 44) from the drive torque estimating signal Test is outputted to the second integrator 42.

A coefficient g1 of the second multiplier 44 and a coefficient g2 of the first integrator 43 are constants for stabilizing action of the speed load estimator 12. Details thereof will be described later.

In FIG. 2, a block 47 surrounded by a chain line corresponds to a synthesizer 15. A block 45 in the synthesizer 47 multiplies the load estimating signal τdest by 1/(gmn·Ktn) to generate a correction signal β. The correction signal β is necessary for generating driving force having magnitude corresponding to the load estimating signal τdest in the arm 3. The correction signal β is added to the speed control signal c in the adder 47.

Next, operation of the speed load estimator 12 in the block 30 will be explained with reference to FIG. 3.

FIG. 3(A) is a block diagram obtained by rewriting the block 30 in FIG. 2, and shows transfer from input of the driving signal u to output of the load estimating signal τdest. FIG. 3(B) is a block diagram obtained by deforming the block diagram in FIG. 3(A) by converting and moving an input position (a comparator 37) of the voltage signal Va based on the equation 2 equivalently. Here, for simplifying the explanation, it is assumed that gm in the block 22 and gmn in the block 32 in FIG. 2 are the same.

$$gm = gmn \quad \text{[Equation 3]}$$

Therefore, it is assumed that driving current Ia(=gm·u) and estimating current Iaest(=gmn·u) are the same.

Attention is paid to a first term and a second term in the equation 2. By multiplying Ea in the first term by (Jn·s)/(Lbn·Kvn), an input position of the comparator 37 in FIG. 3(A) can be equivalently moved to an input position of the subtractor 48 shown in FIG. 3(B). (Ra+La·s)·Ia in the equation 2 is included in a block 39 in FIG. 3(A). With this, it is expressed as shown in block 49 in FIG. 3(B).

If attention is paid to the subtractor 48 in FIG. 3(B), δ which is an output of the subtractor 48 is expressed in the following equation 4.

$$\delta = Ktn \cdot Ia - \frac{Jn \cdot s}{Lbn \cdot Kvn} \cdot Ea \quad \text{[Equation 4]}$$

Next, if attention is paid to the comparator 25 and blocks 24 and 26 in FIG. 2, there is a relation as shown in the following equation 5.

$$Ea = \frac{Lb \cdot Kv}{J \cdot s} \cdot (Kt \cdot Ia - \tau d) \quad \text{[Equation 5]}$$

Here, for simplification, the following equations are assumed.

$$Kt = Ktn \quad Ra = Ran \quad La = Lan \quad \text{[Equation 6]}$$

$$\frac{Lb \cdot Kv}{J} = \frac{Lbn \cdot Kvn}{Jn} \quad \text{[Equation 7]}$$

If the equation 5 is substituted into the equation 4, the equation 4 is deformed as shown in the following equation 8.

$$\delta = \tau d \quad \text{[Equation 8]}$$

That is, δ which is the output of the subtracting means 48 is equal to the load disturbance τd added to the arm 3.

Therefore, if the transfer function from the load disturbance τd caused by friction or the like added to the arm 3 to the load estimating signal τdest is obtained from the block diagram shown in FIG. 3(B), the transfer function becomes as shown in the following equation 9.

$$\tau dest = \frac{\frac{Lbn}{Jn} \cdot Kvn \cdot g2}{s^2 + \frac{Lbn}{Jn} \cdot Kvn \cdot g1 \cdot s + \frac{Lbn}{Jn} \cdot Kvn \cdot g2} \cdot \tau d \quad \text{[Equation 9]}$$

From the equation 9, it is found that the speed load estimator 12 can estimate the load disturbance τd caused by the actual friction from the driving signal u and the voltage signal Va by a loop in the block 30 with secondary delay system.

Here, a natural angular frequency (estimated angular frequency) of the secondary delay system is defined as ωo, and damping factor is defined as ζo, constants g1 and g2 for stabilizing action of the speed load estimator 12 are respectively expressed in the following equations 10 and 11.

$$g1 = 2\zeta_0 \cdot \omega_0 \cdot \frac{Jn}{Lbn \cdot Kvn} \quad \text{[Equation 10]}$$

$$g2 = \omega_0^2 \cdot \frac{Jn}{Lbn \cdot Kvn} \quad \text{[Equation 11]}$$

Here, the estimated angular frequency ωo is set sufficiently higher than a speed control band fc, and the damping factor ζo is selected as being 7 to 1, the load disturbance τd by the friction or the like is precisely estimated by the speed load estimator 12.

If the equation 9 is deformed using the equations 10 and 11, it will be as shown in the following equation 12.

$$\tau dest = \frac{\omega_0^2}{s^2 + 2\zeta_0 + \omega_0 \cdot s + \omega_0^2} \cdot \tau d \quad \text{[Equation 12]}$$

That is, the block diagram of the speed load estimator 12 in FIG. 3(A) is simplified as shown in a block 52 in FIG. 3(C).

Next, operation of the synthesizer 15 shown in the block 47 will be explained in detail with reference to FIG. 4.

The block 45 outputs a correction signal β obtained by multiplying the load estimating signal τdest by 1/(gmn·Ktn) to the adder 46. The correction signal β is for generating a driving force having magnitude corresponding to the load estimating signal τdest in the actuator 9. The correction signal β is outputted to the adder 46. The correction signal β is multiplied by gmn·Ktn by the blocks 22 and 23 and thus, the load estimating signal τdest is previously multiplied by 1/(gmn·Ktn) so as to keep the same size.

FIG. 4(A) shows the adder 46, the comparator 25 and the block 24 relating to the operation of the synthesizer 15 in the block diagram in FIG. 2. FIG. 4(B) is a block diagram in which the load disturbance τd added to the comparator 25 and the load disturbance τd added to the block 52 are combined into one τd.

The block 52 in FIG. 4(A) and the block 52 in FIG. 3(C) are the same, and have a transfer function expressed in the equation 9.

From FIG. 4(B), it is conceived that the load disturbance τd is added to a speed control system through a filter expressed with transfer function in the following equation 13.

$$Gd(s) = 1 - \frac{\omega_0^2}{s^2 + 2\zeta_0 \cdot \omega_0 \cdot s + \omega_0^2} \quad \text{[Equation 13]}$$

$$= \frac{s^2 + 2\zeta_0 \cdot \omega_0 \cdot s}{s^2 + 2\zeta_0 \cdot s + \omega_0^2}$$

FIG. 5 shows frequency characteristic of a transfer function Gd(S) with segment like approximation expressed in the equation 13. From the frequency characteristic of the transfer function Gd(S), gain is equal to or less than 0 dB at angular frequency lower than angular frequency ω. As the angular frequency ω is lowered, it decays with damping ratio of −20 dB/dec (dec means ten times). The transfer function Gd(s) has low-band cut-off filter characteristic for restraining the gain at frequency lower than the angular frequency ωo.

In the first embodiment, even if the load disturbance τd by the friction or the like is applied to the arm 3, the load disturbance τd is estimated by the speed load estimator 12, and it is controlled such that the load disturbance τd added from outside is canceled by the load estimating signal τdest. The load disturbance τd act as if it is added to the speed control system through a filter having cut-off frequency characteristic shown in the equation 13 and FIG. 5. Therefore, at frequency equal to or lower than the angular frequency ω, load disturbance caused by friction or the like is restrained by primary low-band shield characteristic.

FIG. 6 are graphs showing time response for explaining a load disturbance-restraining effect in more detail. FIG. 6(A) shows a load estimating signal τdest output by the speed load estimator 12 when a step-like load disturbance τd shown with 54 in the drawings is added to the arm 3.

Here, values of estimation frequency fo (ωo=2πfo) and damping factor ζo determining control parameters in the equations 10 and 11 were selected as 3 kHz and 1 respectively, the control band of the speed control system was set to 300 Hz, and simulation was carried out. FIG. 6(B) shows a simulation result of the head moving speed v when the load estimating signal τdest output by the speed load estimator 12 was not inputted to the synthesizer 15.

A straight line shown with a chain line 56 indicates the speed command signal vr, and a solid line 57 indicates time waveform of the head moving speed v. The head moving speed v is largely varied at an instant when variation in step-like load disturbance is generated.

FIG. 6(C) shows a simulation result of the head moving speed v when the load estimating signal τdest was inputted to the synthesizer 15 and the signal was inputted to the actuator 9. A straight line 58 shown with a chain line in FIG. 6(C) indicates a speed command signal vr, and a solid line 59 indicates time waveform of the head moving speed v. Even if the variation of step-like load disturbance is added, the head moving speed v is not varied almost at all, and the load disturbance restraining effect is largely improved as compared with the case shown in FIG. 6(B).

As a result, it is possible to precisely estimate the magnitude of the load disturbance caused by friction or the like together with the moving speed of the head. Therefore, even if the variation in load disturbance on the ramp block 7 is great, it is possible to stably control the speed, and to enhance the reliability of the loading/unloading operation of the head.

In the above explanation, the driving signal u output from the block 47 was inputted as one input signal with respect to the speed load estimator 12. However, instead of the driving signal u, driving current Ia output from the block 22 and the driver 10 may be used. In this case also, the same effect can be obtained.

Second Embodiment

In a second preferred embodiment of the present invention, instead of the driving signal u of the first embodiment, a speed control signal c is inputted to the speed load estimator. With this, the adder 38 required in the first embodiment can be omitted and the structure is simplified. This will be explained using FIGS. 7 and 8.

A difference from FIG. 1 is a signal input to a speed load estimator 60. A voltage signal Va generated by the voltage detection means 11 and a speed control signal c generated by the speed controller 14 are inputted to the speed load estimator 60. That is, the second embodiment is characterized in that the speed control signal c is used instead of the driving signal u.

As shown in FIG. 7, the speed control signal c and the load estimating signal τdest are inputted to the synthesizer 15, correction calculation is carried out to generate the driving signal u, and it is outputted to the driver 10.

A block 61 surrounded by chain line in FIG. 8 is a block diagram of the speed load estimator 60. A voltage signal Va generated by the voltage detector 11 which is an output of the adder 28 and a speed control signal c generated by the speed controller 14 expressed with the block 21 are inputted to the speed load estimator 60.

In the speed load estimator 12 of the first embodiment, the driving signal u to which the correction signal β was added is inputted to the speed load estimator 12. Therefore, The adder 38 shown in FIG. 2 is required.

However, in the speed load estimator 60 of the second embodiment, a speed control signal c before the correction signal β was added is inputted and thus, the adder 38 shown in FIG. 2 is unnecessary.

The operation of the speed load estimator 60 in the second embodiment will be explained with reference to FIGS. 2 and 8 in comparison with the operation of the speed load estimator 12 in the first embodiment.

First, in FIG. 2, if an input of the second integrator 42 is defined as γ, a signal γ is expressed as in the following equation while paying attention to the subtractor 31.

$$\gamma = \tau est - (\tau dest + g1 \cdot \alpha) = gmn \cdot Ktn \cdot u - (\tau dest + g1 \cdot \alpha)$$ [Equation 14]

However, the driving signal u is expressed as in the following equation 15 while paying attention to the adder 46 in FIG. 2.

$$u = c + \beta$$
$$= c + \frac{1}{gmn \cdot Ktn} \cdot \tau dest$$ [Equation 15]

Therefore, the signal γ is expressed as in the following equation 16 from the equations 14 and 15.

$$\gamma = gmn \cdot Ktn \cdot c - g1 \cdot \alpha$$ [Equation 16]

If the block diagram 30 of the speed load estimator 12 in FIG. 2 is rewritten based on the equation 16, a block diagram 61 of a speed load estimator 60 shown in FIG. 8 is obtained. A speed control signal a generated by the speed controller 14 (block 21) is inputted to the block 32 of the first multiplier 41, and an output of the block 32 is inputted to the block 33. Thus, it is possible to obtain a drive torque estimating signal rest by multiplying the speed control signal c by a coefficient (gmn·Ktn).

On the other hand, the load estimating signal τdest is inputted to the synthesizer 15 expressed by the block 47. Therefore, as in the first embodiment, the moving speed v of the head 2 and the load disturbance τd by the friction or the like applied to the arm 3 are estimated from the voltage signal Va and the speed control signal c by the action of the speed load estimator 60, and the speed estimating signal vest and the load estimating signal τ dest are generated and outputted. The speed estimating signal vest is fed back to the speed controller 14 through the comparator 13 for controlling the loading/unloading speed of the head 2. The load estimating signal τdest is inputted to the synthesizer 15 such as to cancel the load disturbance τd applied to the arm 3 such as sliding friction between the tab-holding surface on the ramp block 7 and the suspension tab 8. As a result, it is possible to precisely detect the moving speed v of the head and the load disturbance τd by the friction, and even if the variation of the load disturbance on the ramp block is great, stable speed control is realized.

According to the second embodiment, it is possible to reduce the number of an adder required for the structure of the speed load estimator 60 and the synthesizer 15 as compared with the first embodiment. Therefore, as compared with the first embodiment, the same effect is obtained with a simpler structure. When the speed control system is realized with hardware such as an analog circuit, a structure of the circuit can be simplified. When the speed control system is realized with software, it is possible to shorten the calculation time delay by the calculation processing.

In the above-described first and second embodiments, the load disturbance applied to the actuator is canceled using the load estimating signal τdest generated by the speed load estimator 12. However, when the variation of the load disturbance in the ramp block is small, the speed of the head may be controlled only using the speed estimating signal vest generated by the speed load estimator 12 and the load estimating signal τdest may not be used. In this case, the synthesizer 15 is unnecessary, and the structure of the apparatus is simplified.

Third Embodiment

In addition to the compensation of the load disturbance by the loading/unloading action, the third embodiment aims for realizing the high precision positioning by the following action using a common speed load estimator. The embodiment will be explained using FIGS. 9 to 12.

The third embodiment has a position detector 70 for detecting a position of the head 2, and a position controller 71 for generating position control signal cx and a selector 72. The selector 72 selects either one of the speed control signal cv and the position control signal cx, and outputs the selected one of them to the synthesizer 15 as a control signal c' in accordance with a switching command including a loading/unloading command and a following command input to an input terminal 73.

A position signal of the track is previously recorded in each sector of the disk 1 as servo information, and this position signal is read by the head 2. The position detector 70 detects a current position of the head 2 by the position signal read by the head 2, and generates a position error signal ε indicative of an error between the current position and the target position of the target track. The position error signal ε generated by the position detector 70 is inputted to the position controller 71, the signal is amplified and compensated in phase, and the position controller 71 generates the position control signal cx and outputs the same to the selector 72.

If a loading/unloading command is inputted to the input terminal 73 of the selector 72 as the switching command, a switch 74 of the selector 72 is connected to a terminal a, and the head 2 is allowed to move to the target track on the disk 1 at smooth speed. Further, the head 2 is allowed to retreat from the disk 1 to the ramp block 7 smoothly. If a following command is inputted to the input terminal 73 of the selector 72 as a switching command, the switch 74 is also connected to a terminal b, and the head 2 is controlled such as to be positioned on the target track.

In the above description, a positional deviation with respect to the target track generated by the load disturbance τd added from outside is canceled by an load estimating signal τdest generated by the speed load estimator 12.

Since moving speed control of the magnetic head and positioning control of the head with respect to the target track which are totally different from each other are switched in accordance with a switching command to the selector 72, not only the speed control in the loading/unloading of the magnetic head, but also the seek speed control when the magnetic head is moved to the target track can be carried out by the speed load estimator 12.

Conventionally, when the seek action is carried out, the moving speed of the magnetic head is detected from the servo information which is previously recorded in the disk, and the obtained speed signal is used for the speed control of the magnetic head.

Whereas, according to the third embodiment, the speed of the magnetic head is estimated by the speed load estimator 12. Therefore, it is possible to control the seek speed without reproducing the servo information on the disk by the magnetic head.

Although explanation was delayed, the same can be said for the seek speed control without reproducing the servo information also in the above-described first and second embodiments. The same can be said for fourth and fifth embodiments also.

Subsequent to the seeking action, the action is proceeded to following action explained below. Action of the positioning control system when the switch 74 is connected to the terminal b will be explained using FIG. 10. In FIG. 10, a portion 30 surrounded by a chain line is a block of the speed load estimator 12, and this is the same block diagram as the block 30 in FIG. 2. Similarly, a portion 47 surrounded by a chain line is a block of the synthesizer 15. In FIG. 10, a time delay element by sampling of a sector servo is omitted for simplifying explanation.

In FIG. 10, if a current track position detected by the head 2 is defined as x, a position error signal ε with respect to the target track position r is expressed as in the following equation 17. The position error ε is obtained by a comparator 75.

$$\epsilon = r - x \qquad \text{[Equation 17]}$$

The position controller 71 expressed in a block 76 carries out filter processing of a transfer function Gx(s) for the position error signal ε, generates a position control signal cx, and outputs the same to the synthesizer 15 expressed in the block 47 as a control signal c' (=cx). A positioning control system carries out normal PID control, and a transfer function of the position controller 71 is expressed in the following equation 18.

$$Gx(s) = Kx \cdot \left[1 + Td \cdot s + \frac{1}{Ti \cdot s}\right] \qquad \text{[Equation 18]}$$

Here, Kx represents proportional gain of a positioning control system, τd represents differential time constant, and Ti represents integration time constant. To widen the control band of the positioning control system is to increase the proportional gain Kx. An upper limit exists by sampling frequency of a sector servo or natural mechanical resonance frequency possessed by the actuator mechanism. Whereas, in the speed load estimator 12 constituted in the same manner as that of the block 30 in FIG. 2, the speed load estimator 12 is not affected by the sampling frequency of the sector servo. Therefore, the control band of the speed load estimator 12 can be set higher than the control band of the positioning control system.

A block 77 is an integrator, a transfer function is expressed with 1/s, and the moving speed v of the head 2 is converted into a current track position x.

To supply driving current to the coil 5 mounted on the actuator 9 and to transmit an electric signal to the head 2, the actuator 9 is connected to an electronic circuit substrate through an FPC or the like. The actuator 9 is affected by elastic force of the FPC in accordance with the turning motion other than bearing friction of the bearing 4. These are also load disturbances τd. A block 78 represents an elastic coefficient K of the load disturbance τd, and a block 79 represents a viscosity resistant coefficient D. Influence of the elastic coefficient K of the load disturbance τd is proportional to the position x of the head 2 and thus, input to the block 78 is expressed in a form of output to the comparator 25 in the position x. Similarly, since influence of the viscosity resistant coefficient D of the load disturbance τd is proportional to the speed v of the head 2, input to the block 79 is expressed in a form of an output to the comparator 25 in the speed v.

The control signal c' output from the block 76 becomes a driving signal u through the adder 46 constituting the synthesizer 15, and input to the driver 10 expressed in the block 22.

As the load disturbance τd, elastic force of the FPC which connects the actuator 9 and the electronic circuit substrate is also taken into account in addition to the bearing friction of the bearing 4 and bearing friction added to the actuator 9. The speed load estimator 12 estimates this load disturbance τd, and controls such as to cancel the load disturbance τd with the obtained load estimating signal τdest. Therefore, as in the first embodiment, the load disturbance τd acts as if it is added to the positioning control system through the filter having the cut-off frequency characteristic in the equation 13 and FIG. 5. At frequency equal to or lower than the angular frequency ωo, the load disturbance is restrained by the primary low-band cut-off characteristic.

FIG. 11 shows frequency characteristic for explaining improvement effect of the speed load estimator 12 concerning the positioning control characteristic. Values of estimation frequency fo (ωo=2πfo) and damping factor ζo determining control parameters in the equations 10 and 11 were selected as 3 kHz and 1 respectively, the control band of the speed control system was set to 300 Hz, and simulation was carried out.

In FIG. 11, a broken line 81 shows frequency response characteristic of a position x of the head 2 with respect to the target track position r of an ideal case in which no load disturbance τd is applied to the actuator 9. Since the low control band of the positioning control system is set to 300 Hz, the head 2 is allowed to precisely follow the target track up to about frequency 300 Hz.

A number 82 in FIG. 11 represents frequency response characteristic of x/r when bearing friction of the bearing 4 and spring force of the FPC act on the actuator 9 in accordance with the turning motion. Since the frequency is 0 dB or lower around 200 Hz, it is not possible to allow the head 2 to precisely follow the target track in a low-band frequency region of frequency 200 Hz or lower.

A number 83 in FIG. 11 represents frequency response characteristic of x/r when there is effect of the speed load estimator 12. It is found that the frequency approaches frequency characteristic 81 of an ideal case having no load disturbance.

FIG. 12 shows frequency characteristic for explaining the load disturbance-restraining effect of the speed load estimator 12 in more detail. In FIG. 12, a number 84 indicates a response of the position x of the head 2, i.e., transfer characteristic of x/c' with respect to the control signal c' (this is equal to the driving signal u in this case) when no load disturbance is applied to the actuator 9. This shows ideal characteristic of the actuator, and the characteristic becomes a straight line which attenuates with attenuation ratio of −40 dB/dec with respect to increase in frequency.

A number 85 in FIG. 12 indicates frequency response characteristic of the position x of the head 2, i.e., transfer characteristic of x/c' with respect to the control signal c' when bearing friction of the bearing 4 and spring force of the FPC act on the actuator 9. The actuator 9 shows resonance characteristic at frequency 200 Hz, and shows substantially flat transfer characteristic in a low-band frequency region of 100 Hz or lower. In the low-band frequency region of 100 Hz or lower, the head 2 does not move easily by influence of the load disturbance.

A number 86 in FIG. 12 indicates frequency response characteristic of the position x of the head 2 with respect to the control signal c'. The characteristic approaches the ideal frequency characteristic 84 of the actuator having no load disturbance in the low-band frequency region by the effect of the speed load estimator 12, the frequency characteristic of the actuator is largely improved as compared with the case of 85 in FIG. 12, and peak by resonance is not generated neither.

As a result, if the switch 74 of the selector 72 is connected to the terminal b by the following command, the head 2 is controlled such as to be positioned on the target track with high precision. That is, even if elastic force such as bearing friction of the bearing 4 and spring force of the FPC act on the actuator 9, the influence of these load disturbances is canceled by the speed load estimator 12 and the synthesizer 15 and thus, the positioning precision of the magnetic head can be enhanced.

Fourth Embodiment

In the fourth embodiment, instead of the driving signal u in the third embodiment, a control signal c' (either one of the speed control signal cv and the position control signal cx) output from the selector 72 is inputted to the speed load estimator 60. With this, The adder 38 required in the third embodiment can be omitted and the structure is simplified. This will be explained using FIGS. 13 and 14.

A difference from FIG. 9 is a signal input to a speed load estimator 60. A voltage signal Va generated by the voltage detector 11 and the control signal c' output from the selector 72 are inputted to the speed load estimator 60.

FIG. 14 is a block diagram showing the entire structure of the positioning control system when the switch 74 is connected to the terminal b. A portion 61 surrounded by a chain line is a block of the speed load estimator 60, and this is the same block diagram as that of the block 61 in FIG. 8. Similarly, a portion 47 surrounded by a chain line is a block of the synthesizer 15.

In the fourth embodiment, since the speed load estimator 60 indicated with the block 61 in FIG. 8 is applied, the number of an adder required for the structure of the speed load estimator 60 and the synthesizer 15 can be reduced as compared with the above-described third embodiment. Therefore, the same effect can be realized with simpler structure as compared with the third embodiment. When the speed control system is realized with hardware such as an analog circuit, a structure of the circuit can be simplified. When the speed control system is realized with software, it is possible to shorten the calculation time delay by the calculation processing.

Although control is carried out such that the speed control mode and the position control mode are switched in accordance with the switching command in the above-described third and fourth embodiments, it is unnecessary to especially change the control parameter of the speed load estimator in accordance with each mode. Therefore, it is possible to constitute a control system with simple structure.

Fifth Embodiment

In the fifth embodiment, a speed estimating signal vest is fed back to the position controller. This will be explained using FIG. 15.

This embodiment is different from that shown in FIG. 9 in that a position controller 91 inputs not only a position error signal ε output but also a speed estimating signal vest output from the speed load estimator 12, and generates a position control signal cx based on both the signals.

In the third embodiment, the position controller 71 expressed in the block 76 in FIG. 10 carries out the filter processing of the transfer function Gx(s) expressed in the equation 18 for the position error signal ε for carrying out the PID control for positioning the head, and generates the position control signal cx.

A second term in a parenthesis of the equation 18 stabilizes the positioning control system by carrying out the differentiation processing for the position error signal ε. This differentiation processing is expressed as in the following equation 19 from the relational equation 17 if the target track position r is defined as constant.

$$s \cdot \varepsilon = s \ (r - x) = -vest \qquad \text{[Equation 19]}$$

A position control signal cx when the equation 18 is used is as follows.

$$cx = Gx(s) \cdot \varepsilon = Kx \cdot \left[1 + Td \cdot s + \frac{1}{Ti \cdot s}\right] \cdot \varepsilon \qquad \text{[Equation 20]}$$

-continued $$= Kx \cdot \left\{ \left[1 + \frac{1}{Ti \cdot s}\right] \cdot \varepsilon + Td \cdot s \cdot \varepsilon \right\}$$

If s·ε are replaced by "−vest" expressed in the equation 19, $$cx = Kx \cdot \left\{ \left[1 + \frac{1}{Ti \cdot s}\right] \cdot \varepsilon + Td \cdot vest \right\} \quad \text{[Equation 21]}$$

$$= Kx \cdot \left[1 + \frac{1}{Ti \cdot s}\right] \cdot \varepsilon + Kx \cdot Td \cdot vest$$

is established.

The position controller 91 generates a position control signal cx by multiplying the position error signal ε by Kx(1+1/Ti), multiplying the speed estimating signal vest by Kx·Td, and by calculating a difference between both of them. Therefore, the PID control is carried out at the time of positioning and control.

In the case of the third embodiment, servo information on the disk 1 is read by the head 2, the position error signal ε converted by the position detector 70 is subjected to the differentiation processing, thereby stabilizing the positioning control system. However, the position error signal ε reproduced from the disk is not a continuous signal because previously recorded position signal is read from each sector of the disk, but is a discrete signal of sampling cycle T. Therefore, the differentiation processing of the position error signal ε is realized actually by calculating a difference Δε (=ε(n)−ε(n−1)) of a position error signal ε(n−1) of the last sampling from a position error signal ε(n) of the current sampling, and by dividing the difference Δε by the sampling cycle T. Therefore, the differentiated value subjected to the differentiation processing is susceptible to noise included in the position error signal ε. Especially when the seek mode in which the head is allowed to move to the target track is switched to the following mode in which the head is allowed to follow the target track, great error signal is generated. As a result, the positioning control system can not be stabilized, malfunction of the following is caused and access time to an instant when the data has been taken is elongated.

Whereas, in the fifth embodiment, the differentiated value (Td·s·ε) (see equation 20) of the position error signal ε obtained from the disk and the head is not used, but multiplied value (−Kx·Td·vest) is used.

As a result, the speed estimating signal vest is not susceptible to the influence of noise, the signal has no dependence on the sector sampling cycle and thus, malfunction is not generated at the time of the following, and the access time until the instant when the data is read can be shortened.

When the external force received by the actuator 9 is small, the speed of the magnetic head at the time of the seek action or the positioning of the magnetic head at the time of the following action may be controlled using only the speed estimating signal vest generated by the speed load estimator 12, and the load estimating signal τdest may not be used. In this case, the synthesizer 15 is unnecessary, and the structure of the magnetic disk storage apparatus is simplified.

In the above explanation, the speed estimating signal vest is inputted to the position controller 91 based on the apparatus shown in FIG. 9, but the speed estimating signal vest may be inputted to the position controller 91 based on the apparatus shown in FIG. 13.

In the above description, the load estimating signal τdest can estimate the bearing friction applied to the actuator 9 and the elastic force of the FPC, but the load estimating signal τdest can also estimate the inertia force received by the actuator 9 due to impact or vibration added to the apparatus from outside, and the inertia force can also be canceled of course. Therefore, according to the present invention, a magnetic disk storage apparatus which is excellent in resistance to vibration can be realized.

In each of the above-described embodiments, the multiplier and the integrator may be constituted by analog filters or digital filters. A portion constituting the speed control system in each embodiment may be realized by software by a microcomputer.

Although the present invention has been explained based on the magnetic disk storage apparatus in each of the embodiments, the invention is not limited to this, and the invention can also be applied to an optical disc apparatus, a magneto-optical disc apparatus and the like.

While there has been described what is at present considered to be preferred embodiments of the invention, it will be understood that various modifications may be made therein, and it is intended to cover in the appended claims all such modifications as fall within the true spirit and scope of this invention.

What is claimed is:

1. A disk storage apparatus comprising:
   an actuator for loading/unloading a head with respect to a disk,
   a driver of said actuator,
   a voltage detector for detecting voltage generated when said actuator is driven and for outputting a voltage signal,
   a speed load estimator for estimating moving speed of said head and level of a load disturbance added to said head from a driving signal in said voltage detector and said voltage signal, and for outputting a speed estimating signal and a load estimating signal, and
   a speed controller for generating and outputting a speed control signal from a speed command signal and said speed estimating signal,
   wherein said driving signal is obtained by synthesizing said speed control signal and said load estimating signal.

2. The disk storage apparatus according to claim 1, wherein said speed load estimator comprises
   a comparator to which a voltage signal detected by said voltage detector is inputted,
   a first multiplier for multiplying said driving signal by a first coefficient,
   a second multiplier for multiplying output of said comparator by a second coefficient,
   a first integrator for integrating output of said comparator, and
   a second integrator for integrating a value obtained by subtracting, from the output of said first multiplier, an added value obtained by adding the output of said second multiplier and the output of said first integrator, and
   wherein said comparator compares said voltage signal and output of said second integrator, and outputs a result of the comparison to said second multiplier and said first integrator.

3. The disk storage apparatus according to claim 1, wherein said speed load estimator outputs said load estimating signal in a state in which a high-band frequency component is cut-off.

4. A disk storage apparatus comprising:
an actuator for loading/unloading a head with respect to a disk,
a driver of said actuator,
a voltage detector for detecting voltage generated when said actuator is driven and for outputting a voltage signal,
a speed load estimator for estimating moving speed of said head and level of a load disturbance added to said head from a speed control signal and said voltage signal, and for outputting a speed estimating signal and a load estimating signal, and
a speed controller for generating and outputting said speed control signal from a speed command signal and said speed estimating signal,
wherein a driving signal in said driver is obtained by synthesizing said speed control signal and said load estimating signal.

5. The disk storage apparatus according to claim 4, wherein said speed load estimator comprises
a comparator to which a voltage signal detected by said voltage detector is inputted,
a first multiplier for multiplying said speed control signal by a first coefficient,
a second multiplier for multiplying output of said comparator by a second coefficient,
a first integrator for integrating output of said comparator, and
a second integrator for integrating a value obtained by subtracting output of said second multiplier from output of said first multiplier, and
wherein said comparator compares said voltage signal and output of said second integrator, and outputs a result of the comparison to said second mulitiplier and said first integrator.

6. The disk storage apparatus according to claim 4, wherein said speed load estimator outputs said load estimating signal in a state in which a high-band frequency component is cut-off.

7. A disk storage apparatus comprising:
an actuator for loading/unloading a head with respect to a disk,
a driver of said actuator,
a voltage detector for detecting voltage generated when said actuator is driven and for outputting a voltage signal,
a speed estimator for estimating moving speed of said head from a driving signal in said driver and said voltage signal, and for outputting a speed estimating signal, and
a speed controller for generating a speed control signal from a speed command signal and said speed estimating signal, and for outputting as said driving signal,
wherein said speed estimator comprises
a comparator to which a voltage signal detected by said voltage detector is inputted,
a first multiplier for multiplying said driving signal by a first coefficient,
a second multiplier for multiplying output of said comparator by a second coefficient,
a first integrator for integrating output of said comparator, and a second integrator for integrating a value obtained by subtracting, from the output of said first multiplier, an added value obtained by adding the output of said second multiplier and the output of said first integrator, and
wherein said comparator compares said voltage signal and output of said second integrator, and outputs a result of the comparison to said second multiplier and said first integrator.

8. A disk storage apparatus comprising:
an actuator for moving a head with respect to a disk,
a driver of said actuator,
a voltage detector for detecting voltage generated when said actuator is driven and for outputting a voltage signal,
a speed load estimator for estimating moving speed of said head and level of a load disturbance added to said head from a driving signal in said driver and said voltage signal, and for outputting a speed estimating signal and a load estimating signal,
a speed controller for generating and outputting a speed control signal from a speed command signal and said speed estimating signal,
a position detector for generating and outputting an error signal detected by said head corresponding to a current position of said head from servo information which is previously stored in said disk,
a position controller for generating and outputting a position control signal corresponding to said error signal, and
a selector to which said speed control signal and said position control signal are inputted, and either one of said control signals being selected and outputted in accordance with a switching command,
wherein said driving signal is obtained by synthesizing said control signal output from said selector and said load estimating signal.

9. The disk storage apparatus according to claim 8, wherein said speed load estimator comprises
a comparator to which a voltage signal detected by said voltage detector is inputted,
a first multiplier for multiplying said driving signal by a first coefficient,
a second multiplier for multiplying output of said comparator by a second coefficient,
a first integrator for integrating output of said comparator, and
a second integrator for integrating a value obtained by subtracting, from the output of said first multiplier, an added value obtained by adding the output of said second multiplier and the output of said first integrator, and
wherein said a comparator compares said voltage signal and output of said second integrator, and outputs a result of the comparison to said second multiplier and said first integrator.

10. The disk storage apparatus according to claim 8, wherein said position controller generates said position control signal based on said error signal output from said position detector and said speed estimating signal output from said speed load estimator.

11. The disk storage apparatus according to claim 8, wherein a control band of said speed load estimator is set greater than a control band of said position controller or said speed controller.

12. The disk storage apparatus according to claim 8, wherein said actuator loads and unloads said head with respect to said disk.

13. The disk storage apparatus according to claim 8, wherein said actuator grounds on a standby region formed outside a data region in said disk when said disk storage apparatus is not actuated.

14. A disk storage apparatus comprising:
an actuator for moving a head with respect to a disk,
a driver of said actuator,
a voltage detector for detecting voltage generated when said actuator is driven and for outputting a voltage signal,
a speed controller for generating and outputting a speed control signal from a speed command signal and said speed estimating signal,
a position detector for generating and outputting an error signal detected by said head and corresponding to a current position of said head from servo information,
a position controller for generating and outputting a position control signal corresponding to said error signal,
a selector to which said speed control signal and said position control signal are inputted, and either one of said control signals being selected and outputted in accordance with a switching command, and
a speed load estimator for estimating moving speed of said head and level of a load disturbance added to said head from said voltage signal and a control signal output from said selector, and for outputting said speed estimating signal and a load estimating signal,
wherein said driving signal is obtained by synthesizing said control signal output from said selector and said load estimating signal.

15. The disk storage apparatus according to claim 14, wherein said speed load estimator comprises
a comparator to which a voltage signal detected by said voltage detector is inputted,
a first multiplier for multiplying said control signal by a first coefficient,
a second multiplier for multiplying output of said comparator by a second coefficient,
a first integrator for integrating output of said comparator, and
a second integrator for integrating a value obtained by subtracting output of said second multiplier from output of said first multiplier, and
wherein said comparator compares said voltage signal and output of said second integrator, and outputs a result of the comparison to said second multiplier and said first integrator.

16. The disk storage apparatus according to claim 14, wherein said position controller generates said position control signal based on said error signal output from said position detector and said speed estimating signal output from said speed load estimator.

17. The disk storage apparatus according to claim 14, wherein a control band of said speed load estimator is set greater than a control band of said position controller or said speed controller.

18. The disk storage apparatus according to claim 14, wherein said actuator loads and unloads said head with respect to said disk.

19. The disk storage apparatus according to claim 14, wherein said actuator grounds on a standby region formed outside a data region in said disk when said disk storage apparatus is not actuated.

20. A disk storage apparatus comprising:
an actuator for moving a head with respect to a disk,
a driver of said actuator,
a voltage detector for detecting voltage generated when said actuator is driven and for outputting a voltage signal,
a speed estimator for estimating moving speed of said head from a driving signal in said voltage detector and said voltage signal, and for generating and outputting a speed estimating signal,
a speed controller for generating and outputting a speed control signal by a speed command signal and said speed estimating signal,
a position detector for generating and outputting an error signal detected by said head and corresponding to a current position of said head from servo information,
a position controller for generating and outputting a position control signal from an error signal output from said position detector and a speed estimating signal output from said speed estimator, and
a selector to which said speed control signal and said position control signal are inputted and either one of said control signals being selected, and said selected control signal being outputted as said driving signal.

21. The disk storage apparatus according to claim 20, wherein said speed estimator comprises
a comparator to which a voltage signal detected by said voltage detector is inputted,
a first multiplier for multiplying said driving signal by a first coefficient,
a second multiplier for multiplying output of said comparator by a second coefficient,
a first integrator for integrating output of said comparator, and
a second integrator for integrating a value obtained by subtracting, from the output of said first multiplier, an added value obtained by adding the output of said second multiplier and the output of said first integrator, and
wherein said comparator compares said voltage signal and output of said second integrator, and outputs a result of the comparison to said second multiplier and said first integrator.

22. The disk storage apparatus according to claim 20, wherein said position controller generates said position control signal based on said error signal output from said position detector and said speed estimating signal output from said speed load estimator.

23. The disk storage apparatus according to claim 20, wherein a control band of said speed estimator is set greater than a control band of said position controller or said speed controller.

24. The disk storage apparatus according to claim 20, wherein said actuator loads and unloads said head with respect to said disk.

25. The disk storage apparatus according to claim 20, wherein said actuator grounds on a standby region formed outside a data region in said disk when said disk storage apparatus is not actuated.

* * * * *